US012760558B2

(12) United States Patent
Farag

(10) Patent No.: US 12,760,558 B2
(45) Date of Patent: Oct. 13, 2026

(54) REKEYABLE LOCK CYLINDER

(71) Applicant: ASSA ABLOY Americas Residential Inc., New Haven, CT (US)

(72) Inventor: Hanna Farag, Jurupa Valley, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 27 days.

(21) Appl. No.: 18/785,590

(22) Filed: Jul. 26, 2024

(65) Prior Publication Data

US 2025/0043593 A1 Feb. 6, 2025

Related U.S. Application Data

(60) Provisional application No. 63/516,693, filed on Jul. 31, 2023.

(51) Int. Cl.

*E05B 27/00* (2006.01)
*E05B 29/00* (2006.01)
*E05B 35/08* (2006.01)

(52) U.S. Cl.

CPC ........ *E05B 27/005* (2013.01); *E05B 27/0021* (2013.01); *E05B 27/0082* (2013.01); *E05B 29/004* (2013.01); *E05B 29/0066* (2013.01); *E05B 35/083* (2013.01)

(58) Field of Classification Search

CPC .. E05B 27/00; E05B 27/0021; E05B 27/0035; E05B 27/005; E05B 27/0057; E05B 27/0082; E05B 29/004; E05B 29/006; E05B 29/0066; E05B 35/008; E05B 35/083

See application file for complete search history.

(56) References Cited

U.S. PATENT DOCUMENTS 5,956,986 A 9/1999 Vonlanthen
6,959,569 B2 * 11/2005 Strader ................. E05B 29/004 70/495
7,007,528 B2 * 3/2006 Chong ................ E05B 29/0073 70/495
7,900,491 B2 * 3/2011 Chong .................. E05B 27/005 70/495
8,033,150 B2 10/2011 Armstrong et al.

(Continued)

FOREIGN PATENT DOCUMENTS

CN 108518134 9/2018

OTHER PUBLICATIONS

PCT International Search Report and Written Opinion in Application PCT/US2024/040112, mailed Nov. 8, 2024, 15 pages.

(Continued)

*Primary Examiner* — Christopher J Boswell
(74) *Attorney, Agent, or Firm* — Merchant & Gould P.C.

(57) ABSTRACT

A rekeyable lock cylinder with a cylinder body and a rotatable plug assembly is provided. The plug assembly includes a plurality of key followers and a corresponding plurality of racks for operation of a first locking bar. Additionally, the plug assembly includes a plurality of sliders for operation of a second locking bar. The key followers and racks can be rekeyed while the plug assembly is disposed within the cylinder body. The sliders are operated by a side milling cut on a key and provide additional key cut combinations for enhanced security of the rekeyable lock cylinder.

18 Claims, 13 Drawing Sheets

(56) References Cited

U.S. PATENT DOCUMENTS

| | | | | |
|---|---|---|---|---|
| 8,099,988 | B1 | 1/2012 | Wheatland | |
| 8,656,747 | B2 | 2/2014 | Armstrong et al. | |
| 9,657,499 | B2 * | 5/2017 | Emory | E05B 29/004 |
| 10,612,271 | B2 | 4/2020 | Farag et al. | |
| 11,220,840 | B1 * | 1/2022 | Farag | E05B 27/005 |
| 11,319,726 | B2 | 5/2022 | Rufang | |
| 11,572,708 | B2 * | 2/2023 | Farag | E05B 27/005 |
| 12,188,258 | B1 * | 1/2025 | Farag | E05B 27/005 |
| 12,421,762 | B2 * | 9/2025 | Farag | E05B 35/008 |
| 2009/0277240 | A1 * | 11/2009 | Huang | E05B 29/004 70/493 |
| 2012/0247163 | A1 * | 10/2012 | Damikolas | E05B 27/001 70/492 |
| 2016/0265249 | A1 | 9/2016 | Zhang | |
| 2016/0376814 | A1 | 12/2016 | Walls et al. | |
| 2020/0040605 | A1 | 2/2020 | Farag | |
| 2022/0213716 | A1 | 7/2022 | Farag | |

OTHER PUBLICATIONS

PCT International Preliminary Report in Patentability in Application PCT/US2024/040112, mailed Feb. 12, 2026, 11 pages.

* cited by examiner

REKEYABLE LOCK CYLINDER

CROSS-REFERENCE TO RELATED APPLICATION(S)

This application claims the benefit of priority to U.S. Provisional Application No. 63/516,693, filed Jul. 31, 2023, which application is hereby incorporated in its entirety by reference.

BACKGROUND

Lock cylinders that can be rekeyed without removal of a plug assembly are known. These types of locks are highly beneficial to consumers because the locks can be easily rekeyed without calling a locksmith. These rekeyable locks, however, are associated more with residential building security as the number of possible key cut combinations is relatively low (e.g., thousands of possible combinations). Commercial building security may require or desire locks with a high number of possible key cut combinations (e.g., millions of possible combinations). As such, there is a need for a rekeyable lock that increases the number of possible key cut combinations for enhanced security.

SUMMARY

This disclosure relates generally to locks, and in particular, this disclosure relates to a lock with a rekeyable lock cylinder. According to one aspect of the present disclosure, a rekeyable lock cylinder is provided with enhanced security. The rekeyable lock cylinder includes a plug assembly rotatably disposed within a cylinder body. The plug assembly includes a rekeyable key follower and rack system for a first locking bar and that is rekeyable while the plug assembly is disposed within the cylinder body. Enhanced security is facilitated by a slider and second locking bar system. The sliders provide additional key cut combinations and are operated by a side milling cut on the key which is difficult to duplicate.

In an aspect, the technology relates to a rekeyable lock cylinder including: a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including: a plug body; at least one key follower slidably mounted on the plug body; a carrier subassembly slidably mounted on the plug body, the carrier subassembly including: a carrier selectively slidable along the longitudinal axis for rekeying between different keys; a first locking bar slidably mounted on the carrier and selectively engageable with the first locking bar engaging slot to block rotation of the plug assembly relative to the cylinder body; and at least one rack coupled between the at least one key follower and the first locking bar to control movement of the first locking bar; a second locking bar slidably mounted on the plug body and selectively engageable with the second locking bar engaging slot to block rotation of the plug assembly relative to the cylinder body; and at least one slider coupled to the second locking bar to control movement of the second locking bar, wherein movement of the at least one slider is independent from the movement of the at least one rack.

In an example, the at least one slider includes a single post extending from a first side and a locking bar engaging groove defined within a second side, opposite the first side. In another example, the plug body defines a keyway opening extending along the longitudinal axis, the post extending at least partially within the keyway opening such that the at least one slider is actuated directly by a key received within the keyway opening. In yet another example, the post is cylindrical. In still another example, the second side of the at least one slider includes anti-picking grooves. In an example, the at least one slider is disposed on an opposite side of the at least one key follower from the at least one rack.

In another example, the at least one slider is axially offset along the longitudinal axis from the at least one rack. In yet another example, the at least one slider is formed from a different material than the at least one rack. In still another example, the first locking bar and the second locking bar are biased in a same direction. In an example, the first locking bar engaging slot is spaced approximately 180° from the second locking bar engaging slot. In another example, the cylinder body defines at least one third locking bar engaging slot for rekeying the carrier subassembly. In an example, the at least one slider is not rekeyable within the cylinder body while the plug assembly is disposed within the cylinder body.

In another aspect, the technology relates to a rekeyable lock cylinder assembly including: a key having blade with a first key cut and a second key cut, the first key cut independent and at a different position on the blade than the second key cut; a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including: a plug body defining a keyway opening for receiving the key; at least one key follower slidably mounted on the plug body and configured to interact with the first key cut when the key is received within the keyway opening; a carrier subassembly slidably mounted on the plug body, the carrier subassembly including: a carrier selectively slidable along the longitudinal axis for rekeying between different keys; a first locking bar slidably mounted on the carrier and selectively engageable with the first locking bar engaging slot to block rotation of the plug assembly relative to the cylinder body; and at least one rack coupled between the at least one key follower and the first locking bar to control movement of the first locking bar; a second locking bar slidably mounted on the plug body and selectively engageable with the second locking bar engaging slot to block rotation of the plug assembly relative to the cylinder body; and at least one slider coupled to the second locking bar to control movement of the second locking bar, wherein the at least one slider is configured to interact with the second key cut when the key is received within the keyway opening.

In an example, the plug assembly is only rekeyable with respect to the carrier subassembly and the first key cut of the key while the plug assembly is disposed within the cylinder body. In another example, the first key cut is transversely office in two orthogonal directions relative to the second key cut on the blade. In yet another example, the plug body includes at least one transverse channel that slidingly receives the at least one slider, the at least one transverse channel being at least partially open with respect to the keyway opening. In still another example, the at least one slider includes a post extending at least partially within the keyway opening and configured to engage with the second key cut of the key. In an example, the first locking bar engaging slot has a different shape and size than the second locking bar engaging slot.

In another example, the at least one slider includes a first slider and a second slider, the first slider different than the second slider. In yet another example, the at least one rack includes a first rack and a second rack, the first rack the same as the second rack. In still another example, the at least one slider is not spring biased. In an example, the keyway opening is not a KW1 keyway opening.

In another aspect, the technology relates to a method of assembling a rekeyable lock cylinder including: providing a cylinder body defining a longitudinal axis, wherein the cylinder body defines a first locking bar engaging slot and a second locking bar engaging slot; providing a plug assembly having a plug body; mounting at least one key follower and a carrier subassembly to the plug body, the carrier subassembly including a carrier selectively slidable along the longitudinal axis for rekeying between different keys, a first locking bar slidably mounted on the carrier and selectively engageable with the first locking bar engaging slot to block rotation of the plug assembly relative to the cylinder body, and at least one rack coupled between the at least one key follower and the first locking bar to control movement of the first locking bar; and slidably mounting a second locking bar to the plug body that selectively engageable with the second locking bar engaging slot to block rotation of the plug assembly relative to the cylinder body and at least one slider coupled to the second locking bar to control movement of the second locking bar, wherein movement of the at least one slider is independent from the movement of the at least one rack.

In an example, the method further includes cutting a key with a first key cut and a second key cut, the first key cut independent and at a different position on a blade than the second key cut.

In another aspect, the technology relates to a method of rekeying a rekeyable lock cylinder including: inserting a first key into a keyway opening of a plug body of a plug assembly of the rekeyable lock cylinder, the first key having a first key cut and a second key cut, the plug assembly including at least one key follower, a carrier subassembly with a carrier, a first locking bar, and at least one rack coupled between the at least one key follower and the first locking bar, a second locking bar, and at least one slider coupled to the second locking bar, wherein the first key cut positions the first locking bar in an unlocked position and the second key cut positions the second locking bar in an unlocked position; rotating the plug assembly within a cylinder body; inserting a rekeying tool to longitudinally push the carrier with the at least one rack such that the at least one rack is disengaged with the at least one key follower; removing the first key; inserting a second key having a third key cut and a fourth key cut; and rotating the plug assembly so as to reengage the at least one rack with the at least one key follower and the first locking bar is rekeyed to the third key cut that is different than the first key cut, the fourth key cut being the same as the second key cut.

In an example, the second key cut is not rekeyable while the plug assembly is disposed within the cylinder body.

In another aspect, the technology relates to a rekeyable lock cylinder includes: a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including: a plug body defining a keyway opening configured to receive a key, the keyway opening having a top portion and first and second side portions facing each other; at least one key follower slidably mounted on the plug body and disposed at least partially within the top portion of the keyway opening; a carrier subassembly slidably mounted on the plug body, the carrier subassembly including: a carrier selectively slidable along the longitudinal axis for rekeying between different keys; a first locking bar slidably mounted on the carrier and selectively engageable with the first locking bar engaging slot to block rotation of the plug assembly relative to the cylinder body; and at least one rack coupled between the at least one key follower and the first locking bar to control movement of the first locking bar; a second locking bar slidably mounted on the plug body and selectively engageable with the second locking bar engaging slot to block rotation of the plug assembly relative to the cylinder body; and at least one slider coupled to the second locking bar to control movement of the second locking bar, the at least one slider having a post that extends at least partially into the keyway opening from the second side portion.

In an example, the second side portion of the keyway opening is substantially planar. In another example, the first side portion of the keyway opening includes at least one traverse plug. In yet another example, the at least one transverse plug faces the at least one slider within the keyway opening. In still another example, the second side portion of the keyway opening does not include a transverse plug. In an example, the rekeyable lock cylinder further includes a key, the key including a first key cut configured to operationally engage with the at least one key follower and a second key cut configured to operationally engage with the post of the at least one slider.

In another example, the second key cut is a side milled channel defined on a blade of the key. In yet another example, the side milled channel has a tapered entry disposed at a distal end of the blade.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
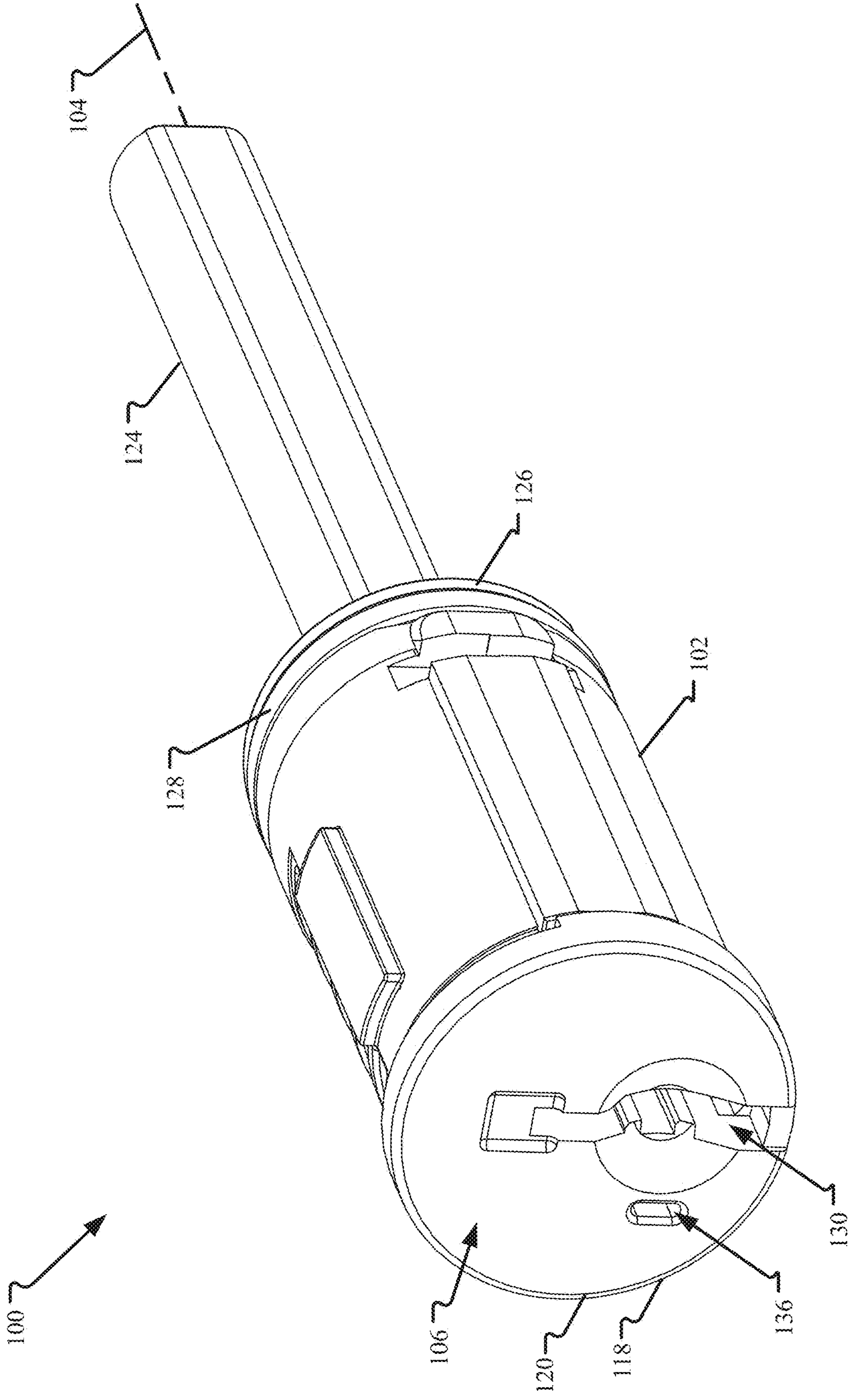
FIG. 1 is a perspective view of an example rekeyable lock cylinder according to an embodiment of this disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," "an example," "an aspect," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurements techniques utilized herein. To the extent such terms may not be clearly defined or understood by one having skill in the art, the term "about" shall mean plus or minus ten percent.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

Throughout this description, references to orientation (e.g., front (ward), rear (ward), top, bottom, back, right, left, upper, lower, etc.) of the components of the rekeyable lock cylinder relate to their position when installed on a door or handle and are used for case of description and illustration only. No restriction is intended by use of the terms regardless of how the components of the rekeyable lock cylinder are situated on its own. As used herein, the terms "axial" and "longitudinal" refer to directions and orientations, which extend substantially parallel to a centerline of the component or system. Moreover, the terms "radial" and "radially" refer to directions and orientations, which extend substantially perpendicular to the centerline of the component or system. In addition, as used herein, the term "circumferential" and "circumferentially" refer to directions and orientations, which extend arcuately about the centerline of the component or system.

In the examples described below, a rekeyable lock cylinder is provided. The rekeyable lock cylinder includes a rekeyable carrier subassembly that is rekeyable without needing to remove the carrier subassembly from a cylinder body. The carrier subassembly includes a first locking bar and a plurality of racks which are coupled to a plurality of corresponding key followers. The rekeyable lock cylinder also includes a second locking bar and a plurality of sliders. The sliders and the racks are independently operable and the sliders provide additional key cut combinations for operation of the rekeyable lock cylinder. The sliders are operated by a separate key cut on the key and may be a side milling cut that is difficult to duplicate.

Figure 2:
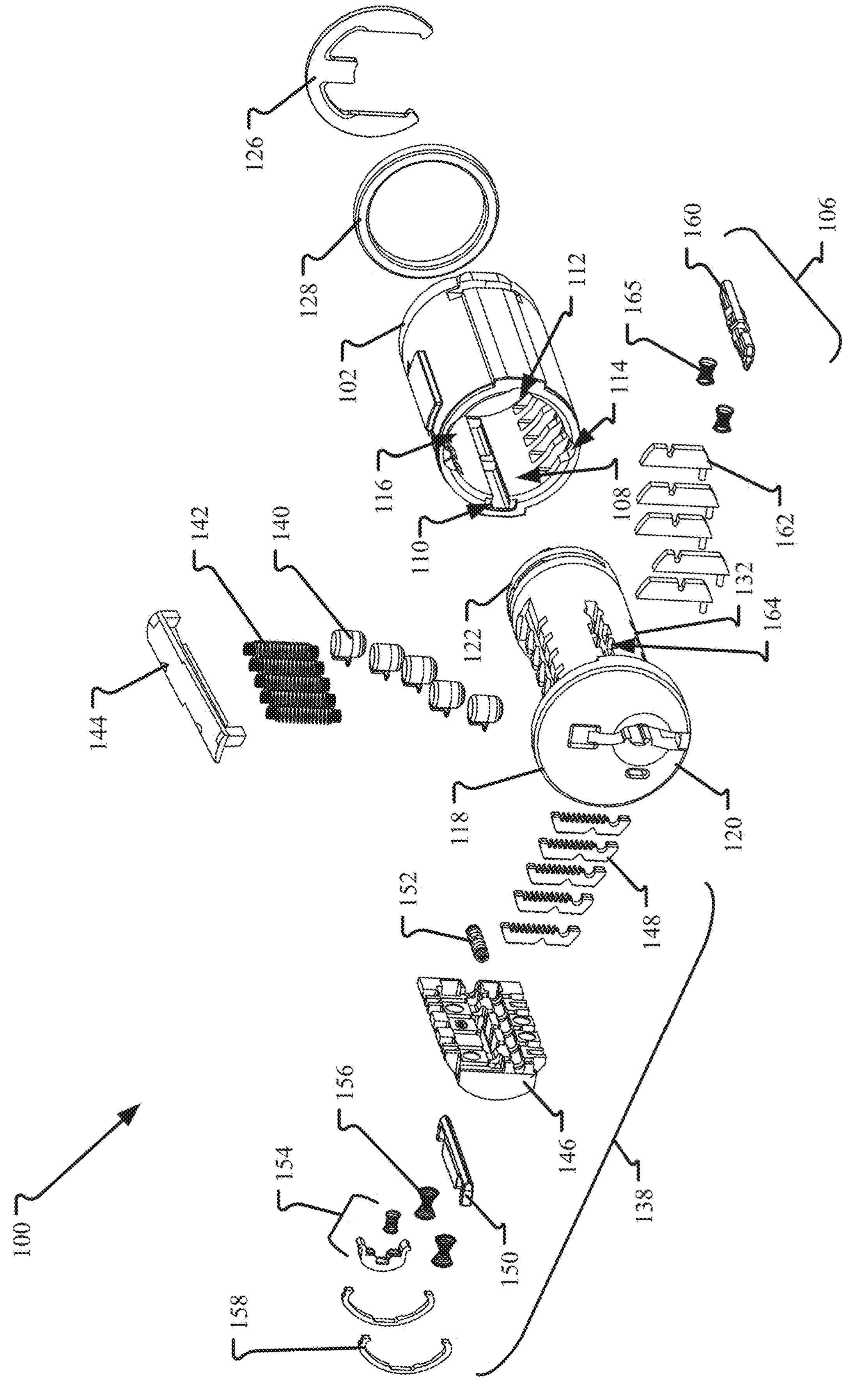
FIG. 2 is a perspective, exploded view of the rekeyable lock cylinder shown in FIG. 1.

FIG. 1 is a perspective view of an exemplary rekeyable lock cylinder 100. FIG. 2 is a perspective, exploded view of the rekeyable lock cylinder 100. Referring concurrently to FIGS. 1 and 2, the rekeyable lock cylinder 100 includes a cylinder body 102 defining a longitudinal axis 104 and a plug assembly 106 disposed at least partially within the cylinder body 102 and selectively rotatable around the longitudinal axis 104. The cylinder body 102 is substantially cylindrical in shape and hollow. In the example, the cylinder body 102 has an inner surface 108 that defines at least one longitudinally extending slot. The cylinder body 102 includes a first locking bar engaging slot 110 and a second locking bar engaging slot 112. The first and second locking bar engaging slots 110, 112 are spaced approximately 180° apart from each other. Additionally, the cylinder body 102 includes a third locking bar engaging slot 114 and a fourth locking bar engaging slot 116. The third and fourth locking bar engaging slots 114, 116 are spaced approximately 180° apart from each other and approximately 90° from the first and second locking bar engaging slots 110, 112.

The plug assembly 106 includes a plug body 118 having a first end 120 and an opposite second end 122 extending along the longitudinal axis 104. The second end 122 is configured to couple to a torque blade 124 via a retainer clip 126. A washer 128 is disposed between the retainer clip 126 and the cylinder body 102 so that the plug body 118 is rotatable relative to the cylinder body 102. The torque blade 124 is configured to couple to a latch assembly (not shown) so as to drive operation of a latch and/or deadbolt. The second end 122 includes a circumferential recess for receiving at least a portion of the retainer clip 126 and so that the plug assembly 106 is retained within the cylinder body 102. The first end 120 is a plug face and defines a keyway opening 130 that extends into an intermediate portion 132 between the first end 120 and the second end 122. The plug body 118 is described further below and with reference to FIGS. 11-13.

Figure 4A:
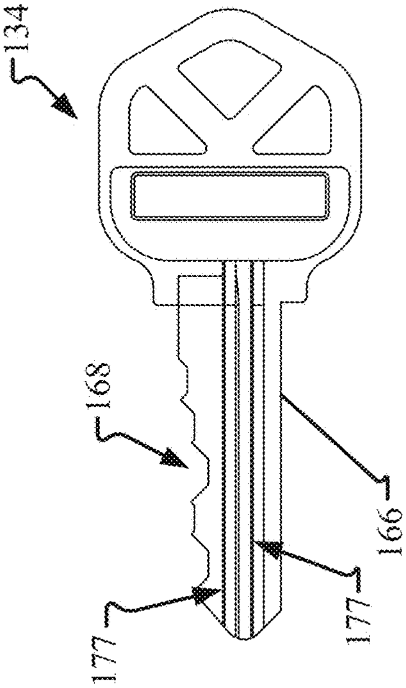
FIGS. 4*a* and 4*b* are side views of a key for use with the rekeyable lock cylinder shown in FIGS. 1 and 2.

The keyway opening 130 is shaped and sized to receive a key 134 (shown in FIG. 4*a,b*). The first end 120 also defines a rekeying tool opening 136 on one side of the keyway opening 130 and extending substantially parallel thereto. The rekeying tool opening 136 is aligned with and facilitates access to a carrier subassembly 138 that is slidably mounted on one side of the intermediate portion 132 of the plug body 118. The carrier subassembly 138 facilitates the rekeyable lock cylinder 100 to be rekeyed between different keys. In the example, the rekeying tool opening 136 is substantially oval in shape. In other aspects, the rekeying tool opening 136 may have any other size and or shape as required or desired.

A plurality of key followers 140 are slidably mounted to the plug body 118 and are biased with biasing members 142 (e.g., a compression spring). The key followers 140 and biasing members 142 are retained within the plug body 118 by a retaining cap 144. The key followers 140 operationally couple to the carrier subassembly 138.

The carrier subassembly 138 includes a carrier 146, a plurality of racks 148 slidably supported on the carrier 146, and a first locking bar 150. The carrier 146 is selectively slidable along the longitudinal axis 104 for rekeying between different keys and is biased with a return spring 152. Additionally, a spring catch 154 is provided for the carrier 146 for rekeying. The first locking bar 150 is slidably mounted on the carrier 146 and at least partially within a first locking bar slot. The first locking bar 150 is biased with a pair of biasing members 156 (e.g., compression spring) which are retained on the carrier 146 by a pair of clips 158. The racks 148 are coupled between the key followers 140 and the first locking bar 150 so as to control movement of the first locking bar 150.

The intermediate portion 132 of the plug body 118 also supports a second locking bar 160 and a plurality of sliders 162. The second locking bar 160 is slidably mounted on the plug body 118 and at least partially within a second locking bar passage 164. The second locking bar 160 is biased with a pair of biasing members 165 (e.g., compression spring). The sliders 162 are coupled to the second locking bar 160 so as to control movement of the second locking bar 160. In the example, movement of the racks 148, and thereby, the first locking bar 150 is independent of movement of the sliders 162, and thereby, the second locking bar 160. This structure facilitates receipt of the key 134 having two independent key cuts and that increases the number of key cut combinations of the rekeyable lock cylinder 100.

Figure 4B:
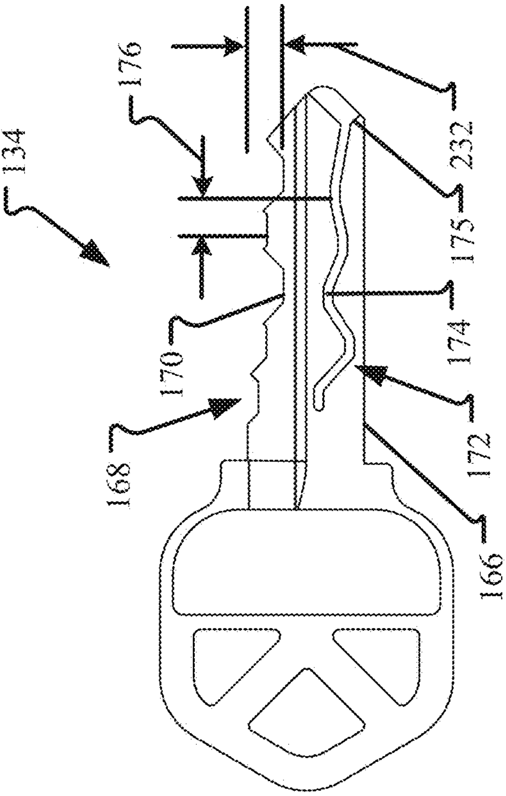
Figure 3:
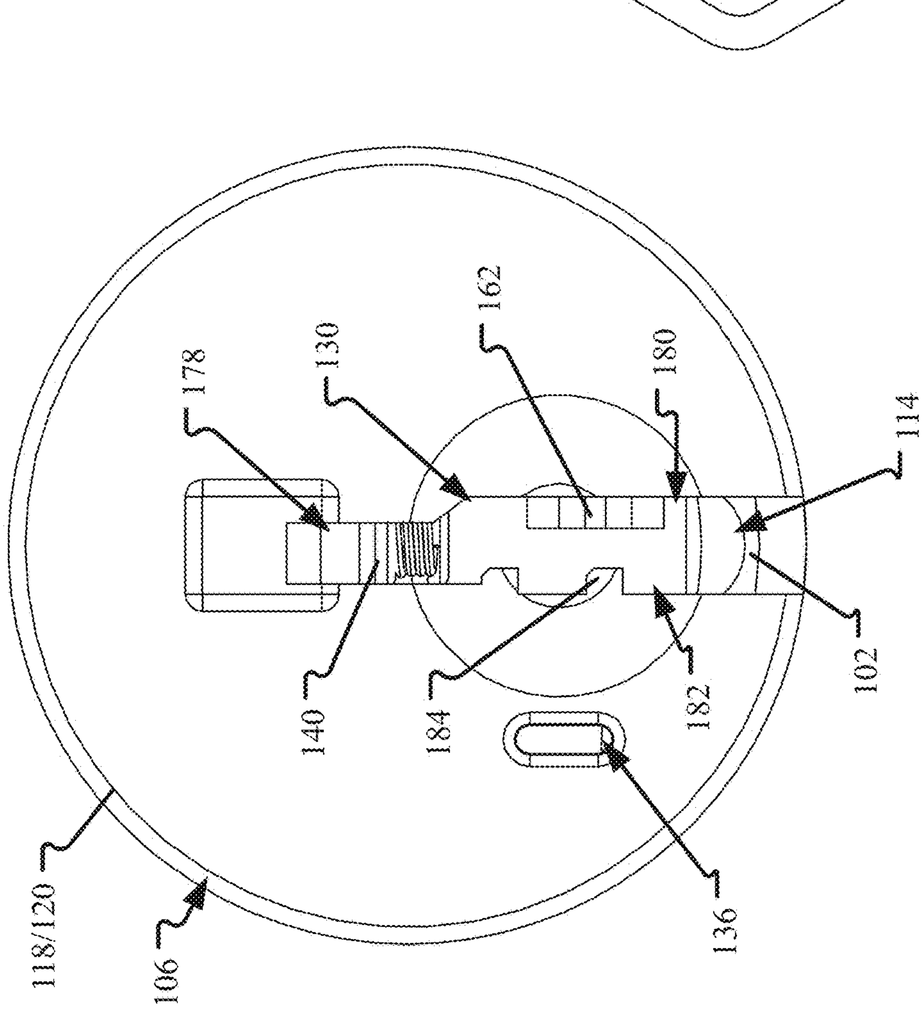
FIG. 3 is an end view of the rekeyable lock cylinder shown in FIGS. 1 and 2.

FIG. 3 is an end view of the rekeyable lock cylinder 100. FIGS. 4*a* and 4*b* are side views of the key 134 for use with the rekeyable lock cylinder 100 (shown in FIG. 3). Referring concurrently to FIGS. 3 and 4*a,b*, the first end 120 of the plug body 118 defines the keyway opening 130 for the key 134 to operationally engage the plug assembly 106. The key followers 140 are positioned at least partially within the keyway opening 130 so as to engage with the key 134 when it is inserted therein. Additionally, the sliders 162 are positioned at least partially within the keyway opening 130 so as to engage with the key 134 when it is inserted therein. In operation, both the key followers 140 and the sliders 162 must be moved within the plug assembly 106 to a position that corresponds with the first and second locking bars 150, 160 (shown in FIG. 2) being able to facilitate rotation of the plug assembly 106.

The key 134 has a blade 166 that is shaped and sized to be received within the keyway opening 130. The blade 166 includes a first key cut 168 that is configured to interact and engage with the key followers 140 so as to selectively position the key followers 140 within the plug assembly 106 to unlock the rekeyable lock cylinder 100 and allow the plug assembly 106 to rotate. In the example, the first key cut 168 is defined on top of the blade 166 and includes a plurality of key cut positions 170 longitudinally spaced along the blade 166. Additionally, the blade 166 includes a second key cut 172 that is configured to interact and engage with the sliders 162 so as to selectively position the sliders 162 within the plug assembly 106 to unlock the rekcyable lock cylinder 100 and allow the plug assembly 106 to rotate. In the example, the second key cut 172 is defined on the side of the blade 166 and includes a plurality of key cut positions 174 spaced along the blade 166. In an aspect, the second key cut 172 may be side milled on the key 134 such that the second key cut 172 is defined as a channel shaped and sized to at least partially receive the posts 252 (shown in FIGS. 9 and 10) of the sliders 162.

The channel of the second key cut 172 extends along the length of the blade 166 so that the sliders 162 are operationally positionable within the plug body 118. An entry 175 of the channel is enlarged and disposed at a tip of the blade 166 so that the posts 252 of the sliders 162 are captured within second key cut 172 during insertion of the key 134 into the plug body 118 and because the sliders 162 may be positioned at different heights within the keyway opening 130. In the example, a height of the entry 175 is at least equal to or greater than the height between the uppermost and lowermost key cut positions 174 of the second key cut 172. The entry 175 includes upper and lower tapered surfaces so that the sliders 162 align into the channel of the second key cut 172.

In operation, the first key cut 168 is independent and at a different position on the blade 166 than the second key cut 172. As such, both the key followers 140 and the sliders 162 are independently positioned within the plug assembly 106 and both the key followers 140 and the sliders 162 are required to be properly positioned in order to unlock the rekeyable lock cylinder 100 and allow the plug assembly 106 to rotate. Both the first and second key cuts 168, 172 are configured to independently move the key followers 140 and sliders 162, respectively, to vertical positions within the plug assembly 106. Accordingly, the number of possible key cut combinations of the rekeyable lock cylinder 100 is exponentially increased when compared to only using the key followers 140 and the corresponding components of the carrier subassembly 138 (shown in FIG. 2).

In the example, the key cut positions 170 of the first key cut 168 are longitudinally offset 176 from the key cut positions 174 of the second key cut 172. In other examples, the key cut positions 170 of the first key cut 168 may be longitudinally aligned with the key cut positions 174 of the second key cut 172. The first key cut 168 is also transversely offset relative to the second key cut 172 in two orthogonal directions. The first key cut 168 is above the second key cut 172 and also positioned to one side. Side milling the second key cut 172 is difficult to reproduce, thereby further enhancing security of the rekeyable lock cylinder 100.

The blade 166 of the key 134 also includes one or more channels 177 disposed on the opposite side of the second key cut 172. These channels 177 extend parallel to each other and are disposed below the first key cut 168. The channels 177 are shaped and sized to at least partially receive the plugs 184 defined in the keyway opening 130 and as described further below. In contrast to the second key cut 172, the channels 177 do not engage with any sliders 162 and have a linear shape. This is because the channels 177 are used to interact with the keyway opening 130 so that different type keys (e.g., KW1 or SC1) are restricted or prevented from being inserted within the keyway opening 130.

The keyway opening 130 has a top portion 178 that receives the first key cut 168 and allows the key followers 140 to interact therewith. The keyway opening 130 has a first side portion 180 that receives the second key cut 172 and allowed the sliders 162 to interact therewith. In the example, the first side portion 180 is substantially planar in shape with only the posts 252 of the sliders 162 extending therefrom. This configuration of the keyway opening 130 facilitates an increase in the number of key cut combinations and access to the sliders 162.

Additionally, the keyway opening 130 has a second side portion 182. In the example, the second side portion 182 includes at least one transverse plug 184 that facilitates defining the shape and size of the keyway opening 130 for the blade 166 of the key 134 and prevents other key shapes from being inserted. The plug 184 is configured to be received within the channel 177 of the key 134. In the example, the plugs 184 are substantially rectangular in shape, although other shapes are also contemplated herein. In an aspect, the keyway opening 130 is not a KW1 keyway opening shape such that KW1 keys cannot be used and/or inserted within the rekeyable lock cylinder 100. In another aspect, the keyway opening 130 is not a SC1 keyway opening shape such that SC1 keys cannot be used and/or inserted within the rekeyable lock cylinder 100. In both KW1 keyway openings and SC1 keyway openings, transverse plugs are disposed on both sides of the keyway opening such that both sides of the blade need to have corresponding channels. In the example, the sliders 162 extending from the first side portion 180 will work in conjunction with the plugs 184 to restrict or prevent KW1 and SC1 key shapes from being inserted into the keyway opening 130.

Figure 5:
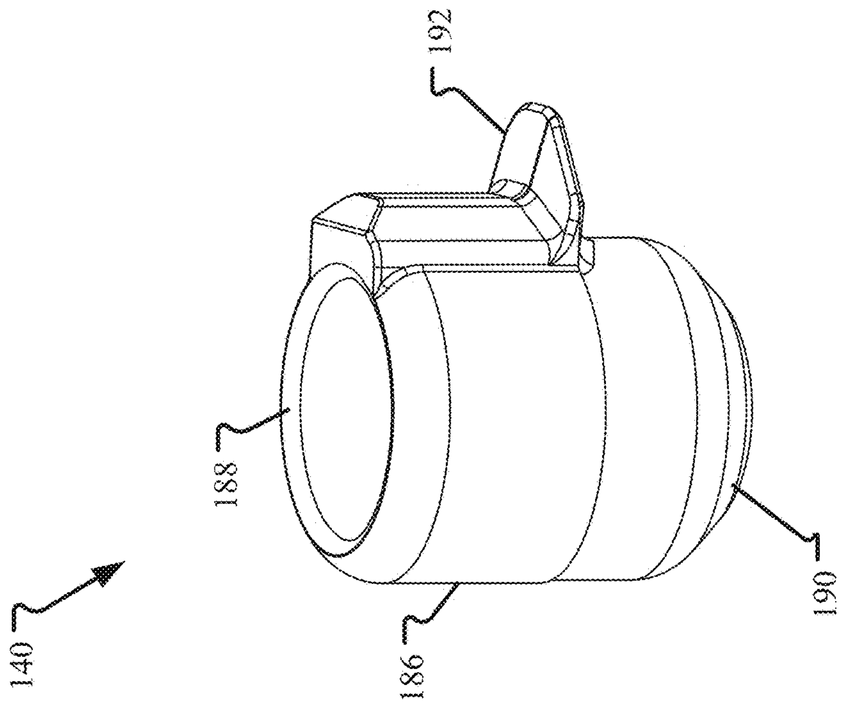
FIG. 5 is a perspective view of a key follower of the rekeyable lock cylinder shown in FIGS. 1 and 2.

FIG. 5 is a perspective view of the key follower 140 of the rekeyable lock cylinder 100 (shown in FIGS. 1 and 2). The key follower 140 includes a cylindrical body 186 with a top end 188 and an opposite bottom end 190. The top end 188 is open such that the biasing member 142 (shown in FIG. 2) is at least partially received within the body 186. The bottom end 190 has a tapered nose that is configured to engage with the key 134 (shown in FIG. 4*a,b*) when inserted within the lock cylinder and move the key follower 140 within the plug assembly 106 (shown in FIG. 2).

The body 186 includes a rack engagement feature 192 extending from one side. The rack engagement feature 192 is configured to selectively engage with the rack 148 (shown in FIG. 6) and in a plurality of different positions. In the example, the rack engagement feature 192 is a fin extension that extends orthogonally from the body 186. In other examples, the rack engagement features 192 may be a post, a ridge, any other extension like element, or a plurality of any other extension like element that facilitates operation of the key follower 140 as described herein.

Figure 6:
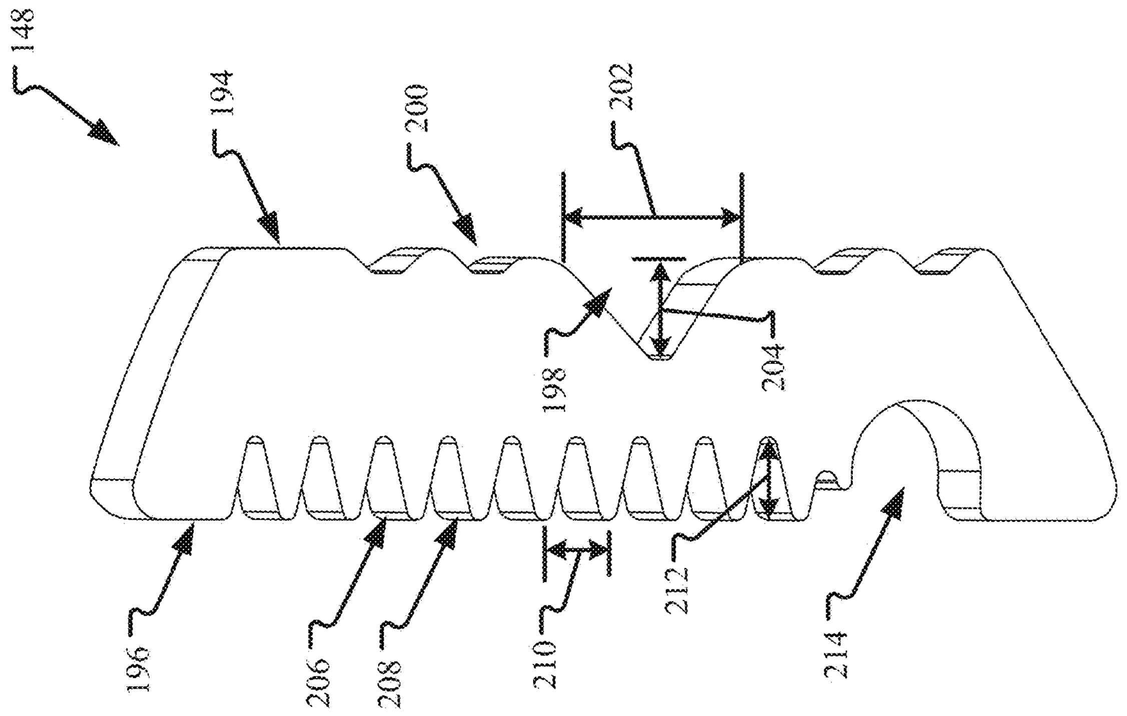
FIG. 6 is a perspective view of a rack of the rekeyable lock cylinder shown in FIGS. 1 and 2.

FIG. 6 is a perspective view of the rack 148 of the rekeyable lock cylinder 100 (shown in FIGS. 1 and 2). The rack 148 has a first side 194 that faces the first locking bar 150 (shown in FIG. 2) and an opposite second side 196 that faces the key follower 140 (shown in FIG. 5). A locking bar engaging groove 198 is defined in the first side 194 and the groove 198 extends towards the second side 196. The first side 194, above and below the locking bar engaging groove 198, may include one or more anti-pick grooves 200. The locking bar engaging groove 198 is defined at least partially by a height 202 extending between top and bottom edges on the first side 194 and a depth 204 that extends transverse relative to the height 202 and to the inward most portion of the groove 198. The locking bar engaging groove 198 is shaped and sized so as to at least partially receive the first locking bar 150 (shown in FIG. 7).

A pin engagement feature 206 is defined on the second side 196. The pin engagement feature 206 is configured to selectively engage with the key follower 140 and in a plurality of different positions spaced along the height of the rack 148. The pin engagement feature 206 is configured to selectively engage with the rack engagement feature 192 of the key follower 140. In the example, the pin engagement feature 206 includes a plurality of grooves 208 that correspond to a possible key cut position of the key 134 (shown in FIG. 4*a,b*). Each groove 208 defines a height 210 extending between top and bottom edges on the second side 196 and a transverse depth 212. The shape and size of each individual groove 208 is smaller than the locking bar engaging groove 198. In the example, half of the height 202 of the locking bar engaging groove 198 is larger than the height 210 of the groove 208. Additionally, the depth 204 of the locking bar engaging groove 198 is larger than the depth 212 of the groove 208. The second side 196 also includes a recess 214 that corresponds to a protruding feature 216 on the plug body 118 (shown in FIG. 11).

Figure 7:
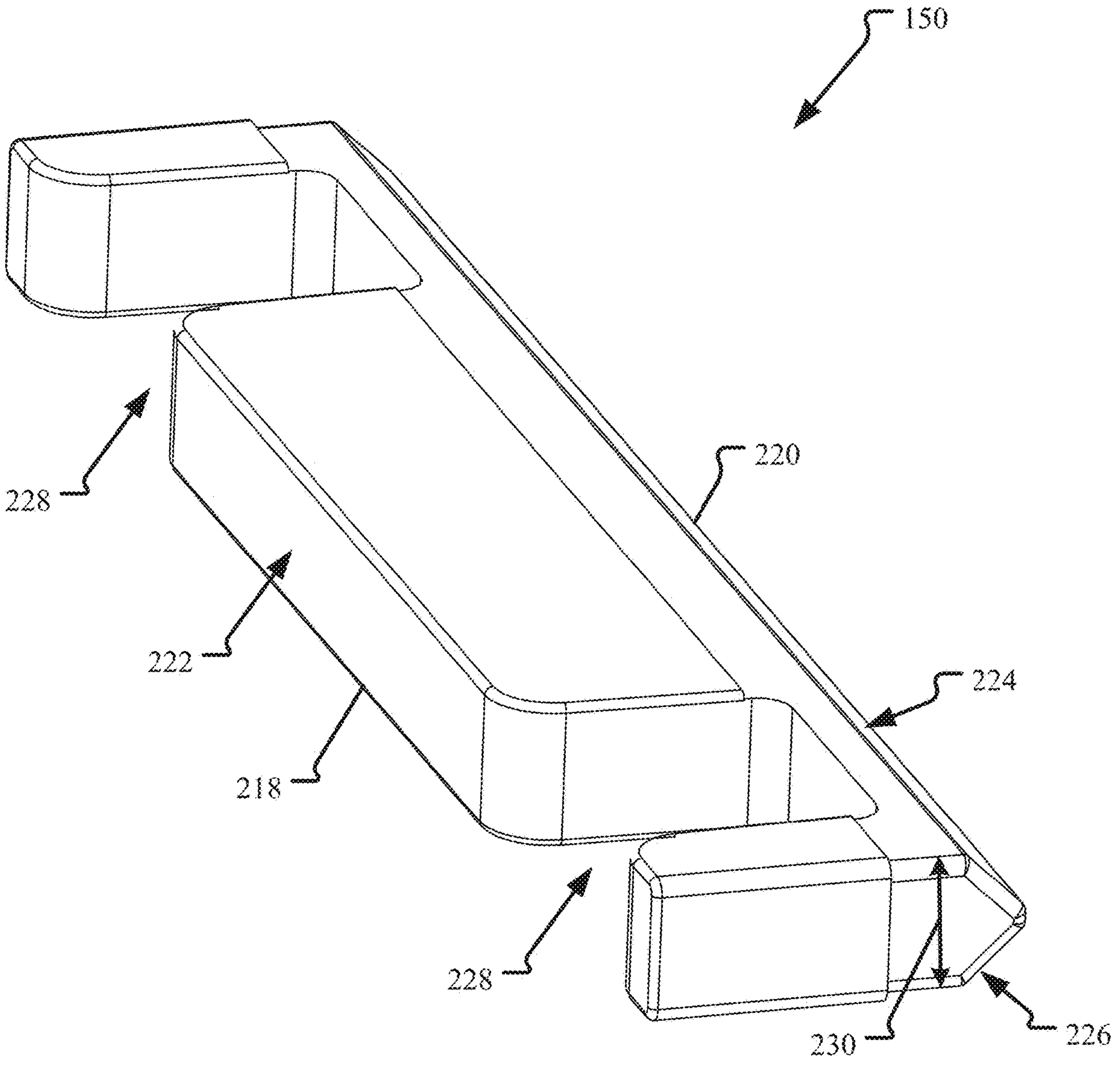
FIG. 7 is a perspective view of a first locking bar of the rekeyable lock cylinder shown in FIGS. 1 and 2.

FIG. 7 is a perspective view of the first locking bar 150 of the rekeyable lock cylinder 100 (shown in FIGS. 1 and 2). The first locking bar 150 includes a first end 218 and an opposite second end 220. The first end 218 has a squared end with a planar surface 222 and is configured to engage with the first locking bar engaging slot 110 of the cylinder body 102 (both shown in FIG. 2). The second end 220 includes a tapered nose with upper and lower camming surfaces 224, 226 and is configured to engage with the locking bar engaging groove 198 of the rack 148 (shown in FIG. 6). The first locking bar 150 also includes a pair of notches 228 for at least partially supporting the biasing member 156 (shown in FIG. 2).

The second end 220 of the first locking bar 150 has a thickness 230 defined prior to the tapered nose. The thickness 230 is less than the height 202 of the locking bar engaging groove 198 of the rack 148 (shown in FIG. 6). This configuration facilitates providing the camming action of the first locking bar 150 away from rack 148 as the first locking bar 150 is biased towards the rack 148. Additionally, by having the locking bar engaging groove 198 of the rack 148 larger than the second end 220 of the first locking bar 150, the second end 220 can more easily slide all the way in so that the plug assembly 106 (shown in FIG. 2) can rotate and the first end 218 disengage the first locking bar engaging slot 110 of the cylinder body 102 (both shown in FIG. 2).

Referring concurrently to FIGS. 4*a*-7, the first locking bar 150 and the racks 148 are supported within the carrier 146 (shown in FIG. 2). Each key follower 140 is configured to engage the rack 148 in a plurality of bitting positions (e.g., the location at which the rack engagement feature 192 of the key follower 140 is coupled to the pin engagement feature 206 of the rack 148 for operation of the rekeyable lock cylinder 100 as described herein). Because the rack 148 can engage with the key follower 140 in a plurality of positions, all of the racks 148 within the plug assembly 106 may have the same structural configuration. The term "bitting position" is referred to as a depth 232 (shown in FIG. 4*b*) of a key cut in a bitting sequence of the key 134. The bitting position is typically identified by a digit or letter that indicates a depth of a key cut, and thereby, corresponds to the position of the rack 148 with respect to the key follower 140 such that movement of the key follower 140 within the rekeyable lock cylinder 100 from the key 134 positions the rack 148 in a operable position with respect to the first locking bar 150. The second end 220 of the first locking bar 150 is then allowed to move into the locking bar engaging groove 198 of the racks 148 and enable the plug assembly 106 (shown in FIG. 2) to rotate. Once the racks 148 are moved out of the operable position defined by the key 134, the racks 148 cam the first locking bar 150 at least partially out of the locking bar engaging groove 198 and into the cylinder body 102 (shown in FIG. 2) such that rotation of the plug assembly 106 is restricted. This operation of the first locking bar 150 and the carrier subassembly 138 is described in further detail in U.S. Pat. No. 10,612,271 B2, dated Apr. 7, 2020, and which is incorporated by reference in its entirety.

It is appreciated, that while one example of rack engagement features and pin engagement features are illustrated, one of ordinary skill in the art understands that other types of pin-rack engagement structures can be utilized. U.S. Patent Application Publication No. 2022/0213716A1, dated Jul. 7, 2022, describes other examples of pin-rack engagement structures and is incorporated by reference herein in its entirety. Furthermore, while the carrier subassembly 138 is described with an inwardly biased first locking bar 150, the first locking bar 150 may alternatively be outward biased as described in U.S. Pat. No. 8,033,150 B2, dated Oct. 11, 2011, and incorporated by reference herein in its entirety. Additionally, in the example, positioning only the racks 148 in an operable position will not alone allow the plug assembly 106 to rotate as the sliders 162 (shown in FIG. 2) also need to be placed in an operable position. The sliders 162 are described in further detail below in reference to FIGS. 9-10.

Figure 8:
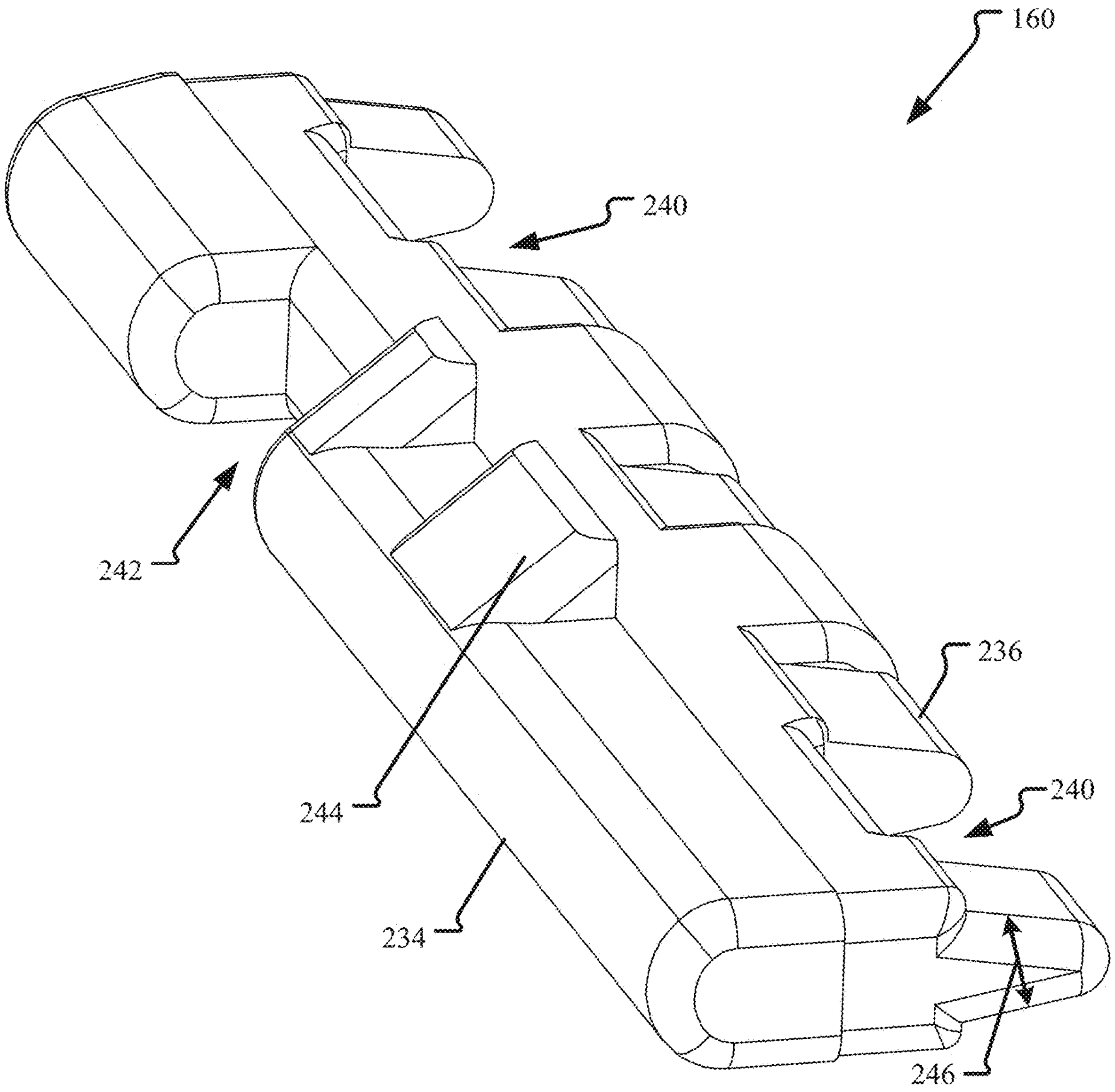
FIG. 8 is a perspective view of a second locking bar of the rekeyable lock cylinder shown in FIGS. 1 and 2.

FIG. 8 is a perspective view of the second locking bar 160 of the rekeyable lock cylinder 100 (shown in FIGS. 1 and 2). The second locking bar 160 includes a first end 234 and an opposite second end 236. Both the first end 234 and the second end 236 are rounded with the first end 234 having a larger radius than the second end 236, and thus, bigger. The first end 234 is configured to engage with the second locking bar engaging slot 112 of the cylinder body 102 (both shown in FIG. 2). The second end 236 is configured to engage with a locking bar engaging groove 238 of the slider 162 (both shown in FIGS. 9 and 10). The second locking bar 160 also includes a pair of notches 240 defined in the second end 236 for at least partially supporting the biasing member 165 (shown in FIG. 2). At the first end 234, the second locking bar 160 can include one or both of a notch 242 and projections 244 that facilitate retaining the second locking bar 160 at least partially within the plug body 118 (shown in FIG. 2). At the second end 236, a thickness 246 of the second locking bar 160 is defined. The thickness 246 tapers inward such that the thickness 246 of the second end 236 narrows towards the distal end.

Figure 10:
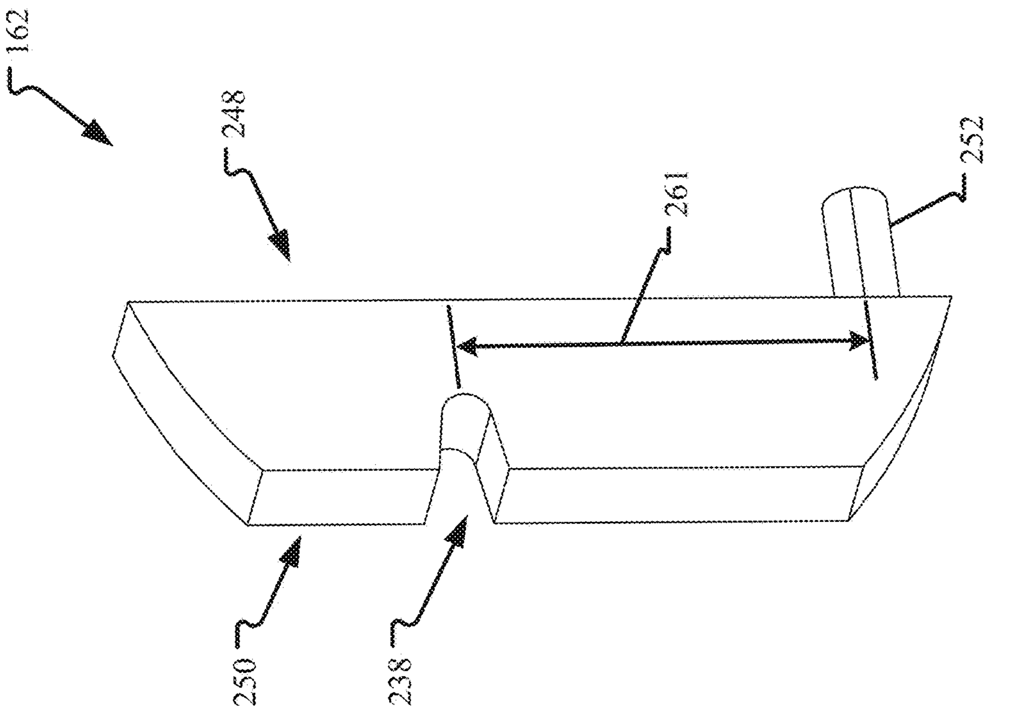
FIGS. 9 and 10 are perspective views of a slider of the rekeyable lock cylinder shown in FIGS. 1 and 2.
Figure 9:
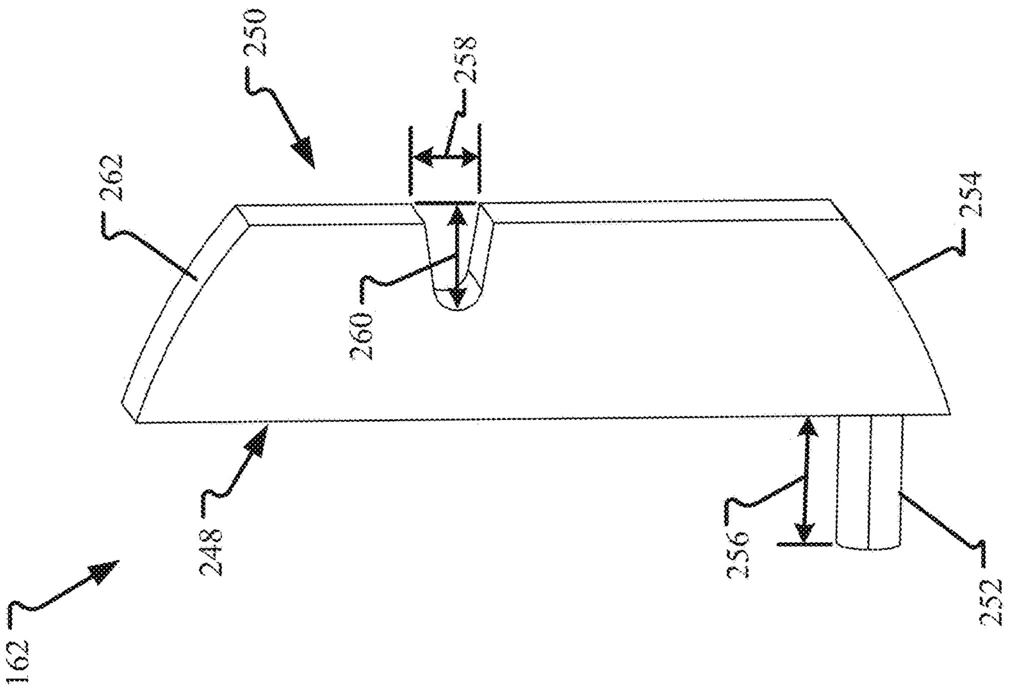

FIGS. 9 and 10 are perspective views of the slider 162 of the rekeyable lock cylinder 100 (shown in FIGS. 1 and 2). Referring concurrently to FIGS. 9 and 10, the slider 162 has a first side 248 that faces the keyway opening 130 of the plug body 118 (shown in FIG. 3) and an opposite second side 250 that faces the second locking bar 160 (shown in FIG. 8). A post 252 extends from a bottom end 254 of the first side 248. In the example, the post 252 is substantially cylindrical, however other cross-sectional shapes can be used as required or desired. The post 252 is configured to engage with the second key cut 172 of the key 134 (both shown in FIG. 4*b*) so as to selectively position the slider 162 within the plug body 118 (shown in FIG. 2). The post 252 extends a distance 256 out from the first side 248. The first side 248 may be a planar surface so as to facilitate sliding movement of the slider 162 within the plug body 118.

The locking bar engaging groove 238 is defined in the second side 250 and the groove 238 extends towards the first side 248. The second side 250, above and below the locking bar engaging groove 238, may be planar as shown and used to restrict the second locking bar 160 from being disengaged from the cylinder body 102 (shown in FIG. 2). In aspects, the second side 250 may include one or more anti-pick grooves (e.g., similar to the grooves 200 shown in FIG. 6). The locking bar engaging groove 238 is defined at least partially by a height 258 extending between top and bottom edges on the second side 250 and a depth 260 that extends transverse relative to the height 258 and toward the inward most portion of the groove 238. The locking bar engaging groove 238 is shaped and sized so as to at least partially received the second locking bar 160. In this example, the shape and size of the locking bar engaging groove 238 corresponds to the shape and size of the second end 236 of the second locking bar 160 (shown in FIG. 8 and e.g., the tapered thickness 246 of the second end 236). This configuration facilitates allowing the second locking bar 160 to be cammed into the locking bar engaging groove 238 via the cylinder body 102 (shown in FIG. 2) as the second locking bar 160 is biased towards the cylinder body 102. Additionally, the corresponding shapes and sizes between the locking bar engaging groove 238 and the second locking bar 160 reduce or prevent cross-keying from occurring (e.g., whereby a key cut that is close to, but not a valid key cut from operating the second locking bar 160).

In the example, the sliders 162 are different than the racks 148 (shown in FIG. 6) because the operation of the corresponding locking bars are different and as described herein. The locking bar engaging groove 238 of the sliders 162 are smaller (e.g., height 258 and/or depth 260) than the locking bar engaging groove 198 of the racks 148. The locking bar engaging groove 238 is sized and shaped so that the second locking bar 160 cams into it for unlocking from interaction with the cylinder body 102 (shown in FIG. 2). In contrast, the locking bar engaging groove 198 of the racks 148 is sized and shaped so that the first locking bar 150 interacts with the groove and for camming into a locking position.

Referring concurrently to FIGS. 4 and 8-10, the second locking bar 160 and the sliders 162 are supported within the plug body 118 (shown in FIG. 2). The structural configuration of each of the sliders 162 defines the bitting position of the sliders 162. That is the slider 162 defines a bitting distance 261 that is the height between centerlines of the post 252 and the locking bar engaging groove 238, and two or more sliders 162 can have different bitting distances 261. As such, when the key 134 engages with the posts 252, the key 134 via the second key cut 172 positions the sliders 162 in an operable position with respect to the second locking bar 160 and align the locking bar engaging grooves 238. The second end 236 of the second locking bar 160 is then allowed to move into the locking bar engaging grooves 238 of the sliders 162 as the plug assembly 106 (shown in FIG. 2) rotates. Once the sliders 162 are moved out of the operable position defined by the key 134, the biasing of the second locking bar 160 urges the second locking bar 160 out of the locking bar engaging groove 238 and into the cylinder body 102 (shown in FIG. 2) such that rotation of the plug assembly 106 is restricted. Accordingly, two or more sliders 162 may be different from one another and have a different location of the locking bar engaging groove 238 relative to the post 252. Additionally, positioning only the sliders 162 in an operable position will not alone allow the plug assembly 106 to rotate as the racks 148 (shown in FIG. 6) also need to be placed in an operable position and as described above. The bottom end 254 of the slider 162 and a top 262 of the slider 162 are both curved so as to match the inner diameter of the cylinder body 102.

Figure 11:
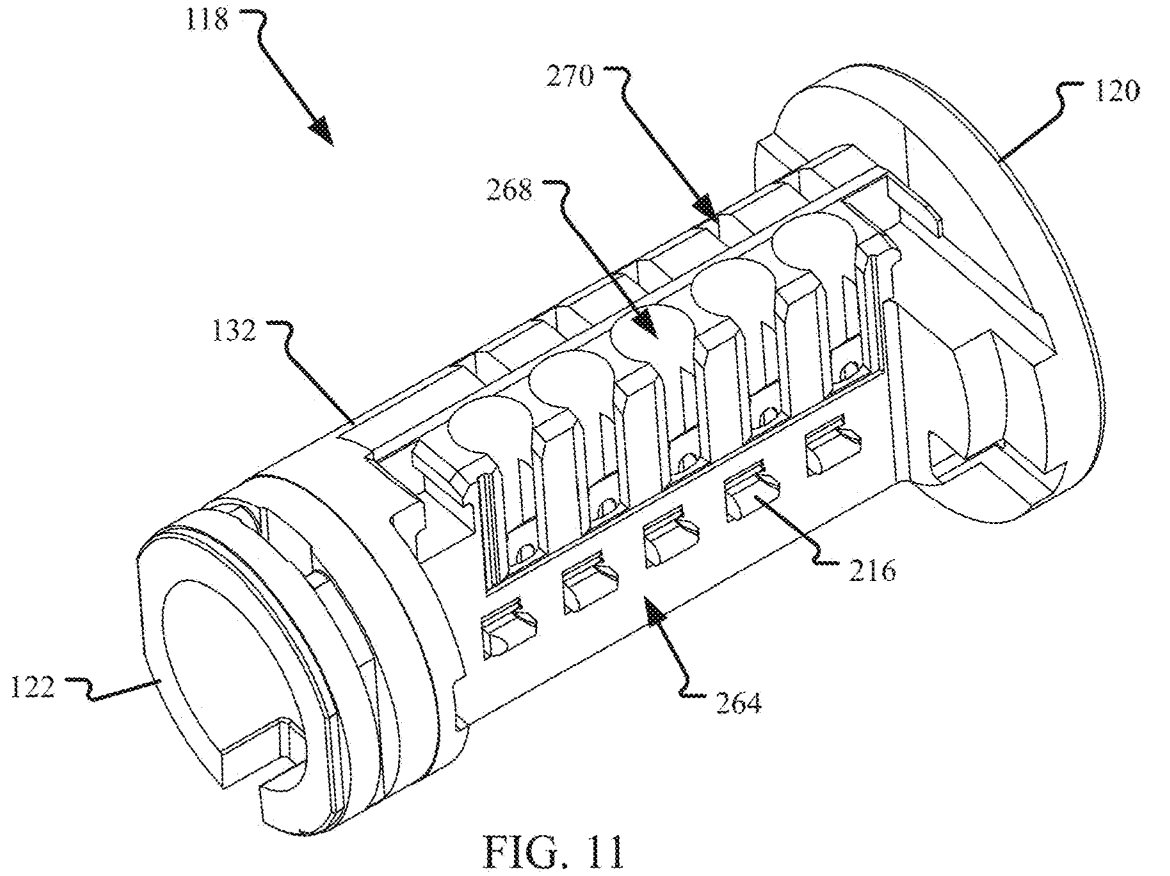
FIGS. 11, 12, and 13 are perspective views of a plug body of the rekeyable lock cylinder shown in FIGS. 1 and 2.
Figure 12:
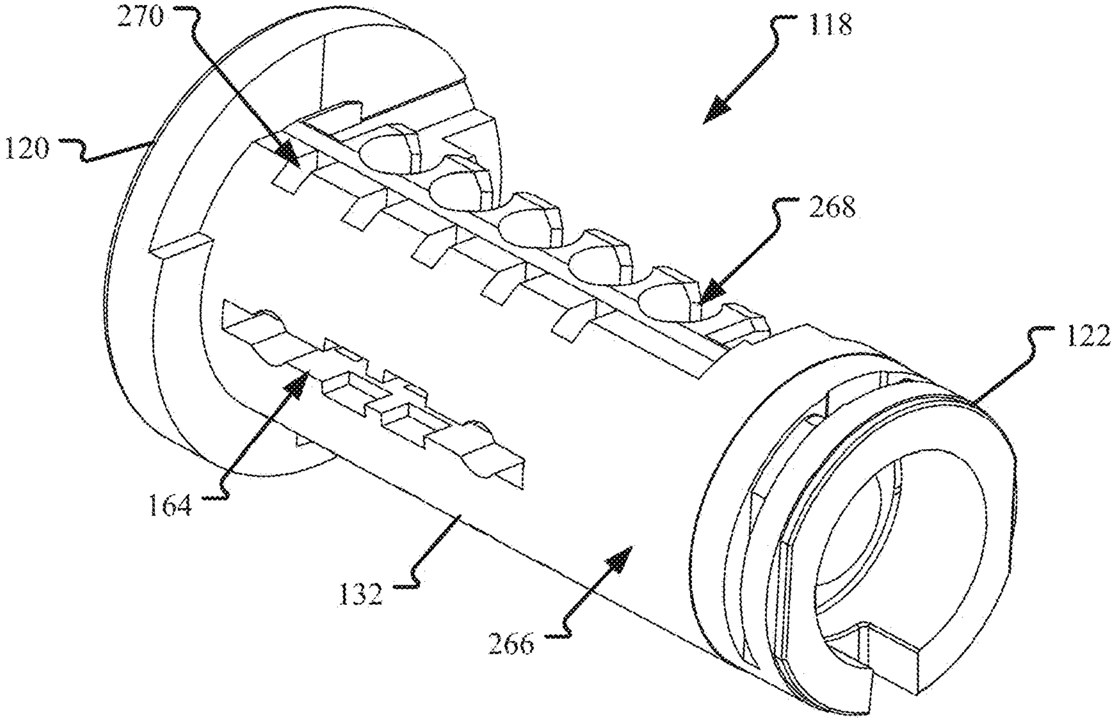
Figure 13:
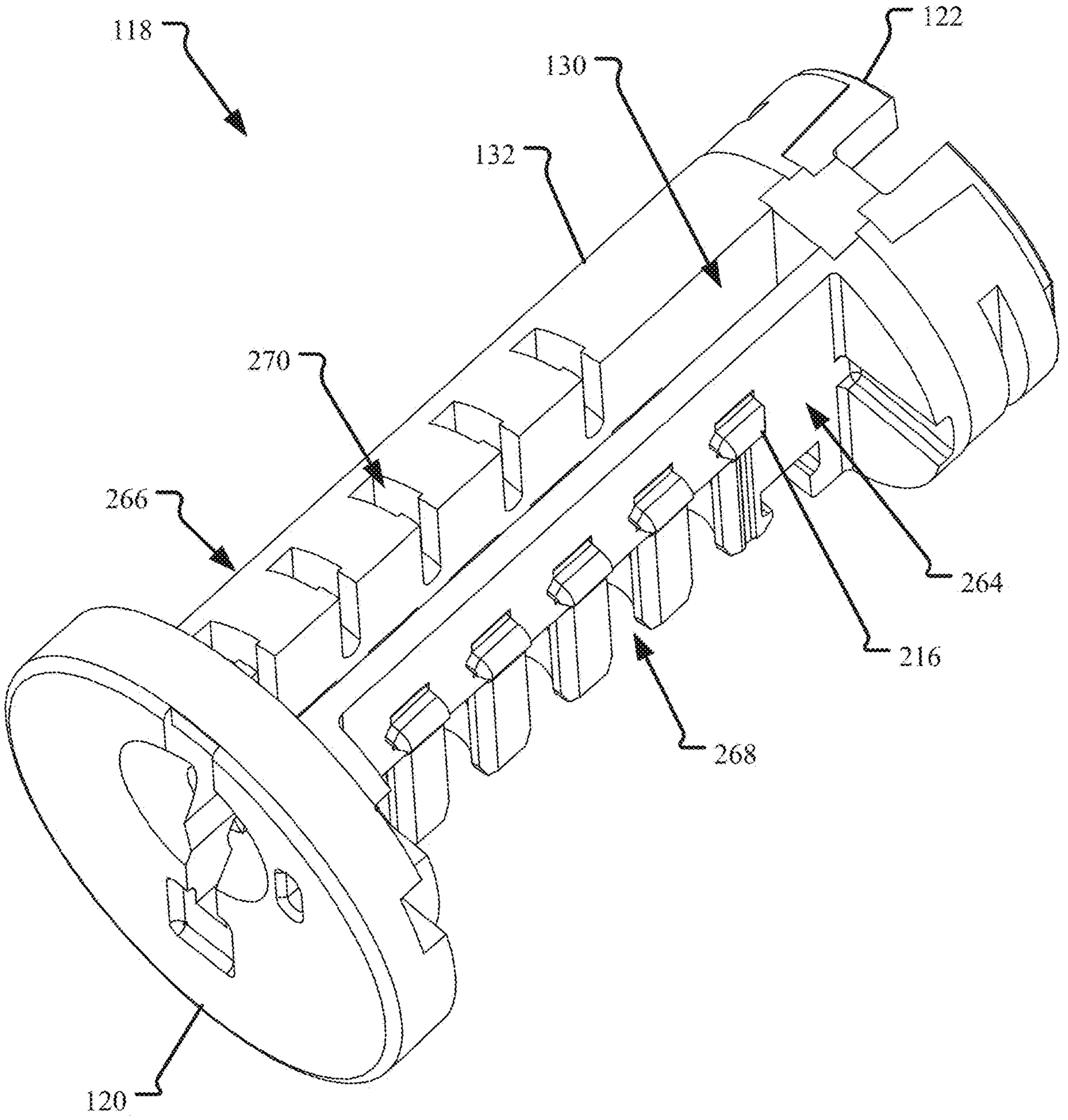

FIGS. 11-13 are perspective views of the plug body 118 of the rekeyable lock cylinder 100 (shown in FIGS. 1 and 2). The plug body 118 includes the first end 120 that defines the plug face and allows entry into the keyway opening 130, the intermediate portion 132, and the second end 122. The intermediate portion 132 includes a first side 264 that is substantially planar and configured to receive the carrier subassembly 138 (shown in FIG. 2) adjacent thereto. The protruding features 216 are defined on the first side 264 and are configured to facilitate rekeying of the carrier subassembly 138. Additionally, the intermediate portion 132 includes a second side 266 that is substantially curved and is configured to support the second locking bar 160 and the sliders 162 (both shown in FIGS. 8-10).

Between the first and second sides 264, 266, the intermediate portion 132 defines a plurality of channels 268 extending radially therein. The key followers 140 (shown in FIG. 5) are slidably mounted within the channels 268 and are biased therein. The channels 268 extend partially through the intermediate portion 132 and are open in relation to the first side 264 such that the key followers 140 can engage with the racks 148 (shown in FIG. 6) that are within the carrier subassembly 138. In the example, there are five channels 268 axially spaced within the intermediate portion 132. It is appreciated that more or less than five channels 268 may be used and depending on how many key followers 140 are present in the rekeyable lock cylinder 100.

The second side 266 includes the second locking bar passage 164 extending longitudinally and so that the second locking bar 160 extends and retracts from the second side 266. Additionally, the second side 266 includes a plurality of slider channels 270 extending transversely in the plug body 118. The sliders 162 are slidably mounted within the slider channels 270. At least a portion of the slider channels 270 are open relative to the keyway opening 130. This enables the post 252 (shown in FIGS. 9 and 10) of the sliders 162 to project within the keyway opening 130 for directly engaging with the key as described herein. In the example, there are five slider channels 270 axially spaced within the intermediate portion 132. It is appreciated that more or less than five slider channels 270 may be used and depending on how may sliders 162 are present in the rekeyable lock cylinder 100.

The channels 268 for the key followers 140 are parallel to and discrete from the slider channels 270 for the sliders 162. In the example, the channels 268 are axially offset from the slider channels 270 so that the structural strength of the plug body 118 is maintained or increased. This configuration places the racks 148 and the sliders 162 disposed on opposite sides of the key followers 140, and the sliders 162 are axially offset from the racks 148. In other examples, the channels 268 may axially align with the slider channels 270 as required or desired. This configuration allows the racks 148 and the sliders 162 to be axially aligned with each other.

Figure 15:
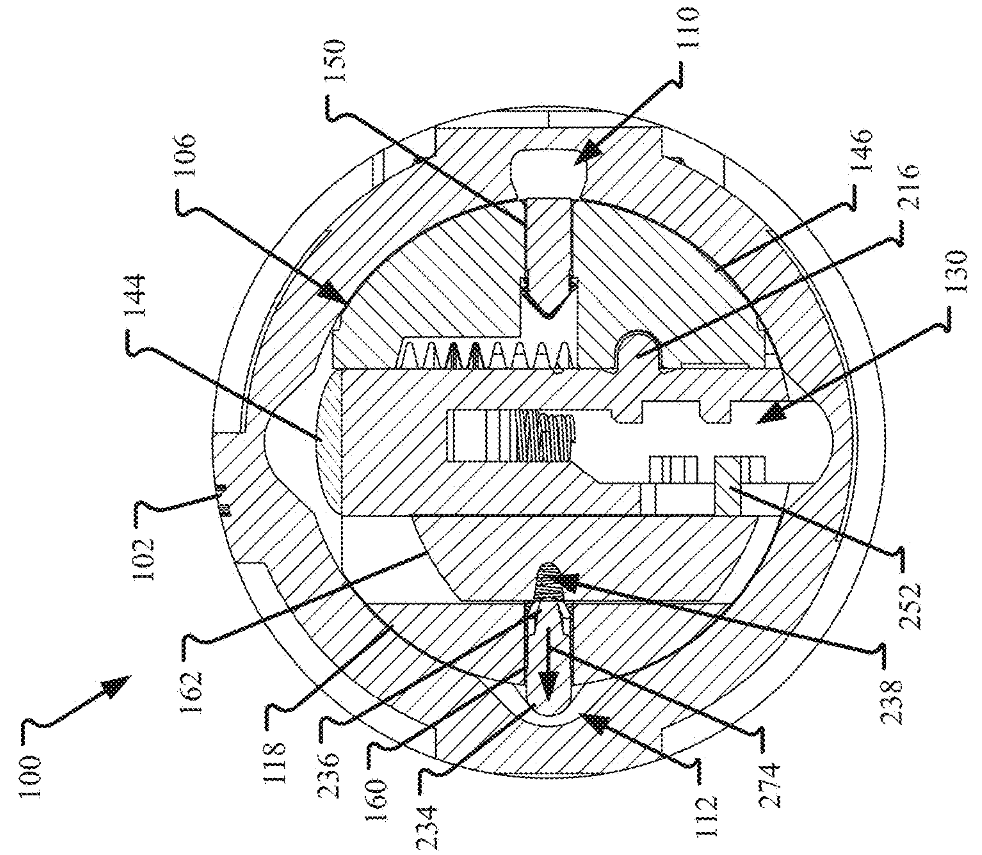
FIGS. 14 and 15 are cross-sectional views of the rekeyable lock cylinder shown in FIGS. 1 and 2 and in an unlocked configuration.
Figure 14:
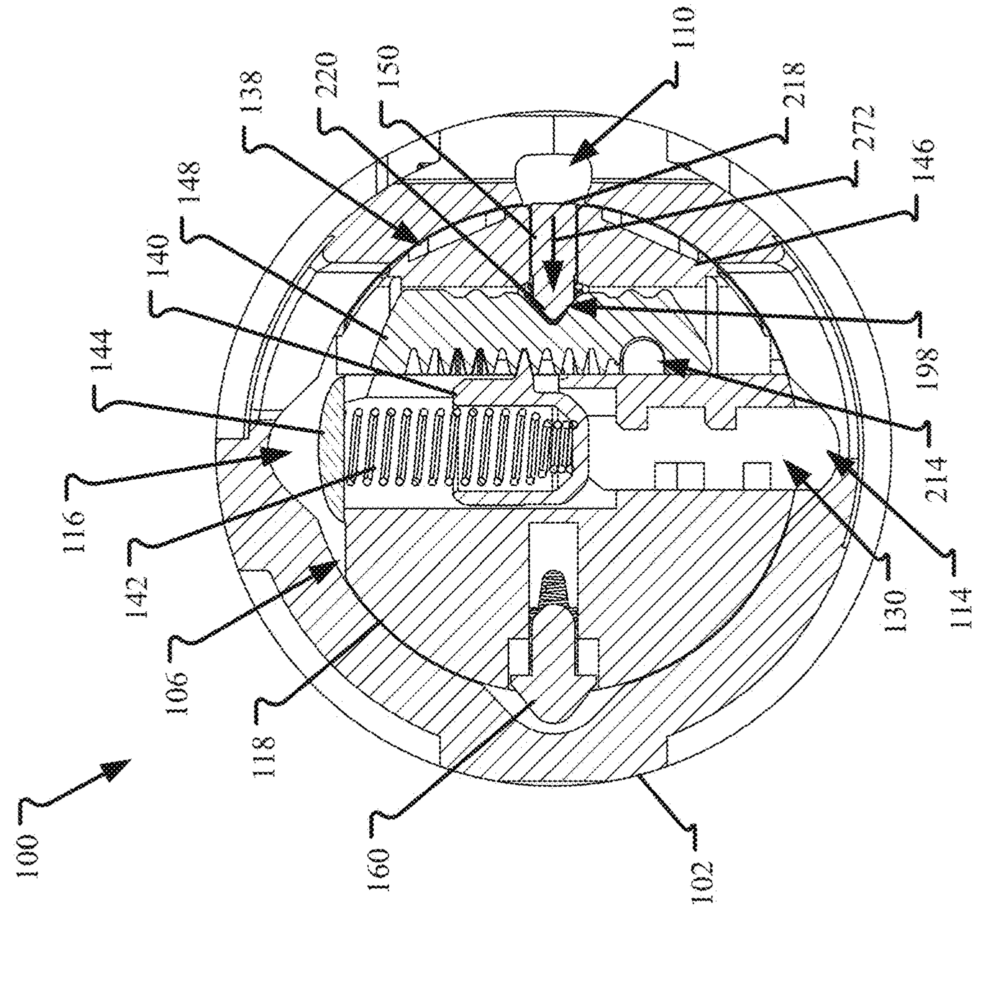

FIGS. 14 and 15 are cross-sectional views of the rekeyable lock cylinder 100 in an unlocked configuration. Referring concurrently to FIGS. 14 and 15, FIG. 14 is a cross-section taken through the rack 148, while FIG. 15 is a cross-section taken through the slider 162 because the rack 148 and the slider 162 are axially offset. Additionally, certain components are described above and are not necessarily described further below. In the unlocked configuration, a valid key (e.g., the key 134 (shown in FIG. 4*a,b*)) is inserted into the keyway opening 130 such that both the key follower 140 and the sliders 162 are operationally positioned within the plug assembly 106 and the first and second locking bars 150, 160 are moved/movable towards an unlocked position.

Starting first with the carrier subassembly 138 and FIG. 14, the valid key operationally positions the key followers 140 vertically within the plug body 118 and against the biasing force of the biasing member 142. This is performed via the first key cut 168 (shown in FIG. 4*a,b*) of the key 134. The key follower 140 moves the rack 148 so that the locking bar engaging groove 198 is aligned with the first locking bar 150. Because the first locking bar 150 is biased inward 272, the second end 220 is urged into the locking bar engaging groove 198 so as to move the first end 218 out of the first locking bar engaging slot 110 of the cylinder body 102. Once the first locking bar 150 is out of the first locking bar engaging slot 110, the plug assembly 106 is enabled to be rotated around the longitudinal axis 104 (shown in FIG. 1).

Additionally, turning to FIG. 15, the valid key also operationally positions the sliders 162 vertically within the plug body 118. This is performed via the second key cut 172 (shown in FIG. 4*b*) of the key 134 directly actuating the posts 252 extending at least partially within the keyway opening 130. In the example, the sliders 162 are not spring biased within the plug body 118, and thus, slide via gravity and engagement with the key 134. In other examples, the sliders 162 may be spring biased as required or desired. The sliders 162 are positioned such that the locking bar engaging groove 238 is aligned with the second locking bar 160. However, unlike the first locking bar 150, the second locking bar 160 is biased outward 274 and the second locking bar 160 is not automatically moved towards the sliders 162. Rather, the first end 234 of the second locking bar 160 is being urged into the second locking bar engaging slot 112 of the cylinder body 102, and only when the plug assembly 106 is rotated will the first end 234 cam out of engagement with the second locking bar engaging slot 112 and position the second end 236 of the second locking bar 160 within the locking bar engaging groove 238. The plug assembly 106, is then enabled to continue to be rotated around the longitudinal axis 104. It is appreciated that if the locking bar engaging groove 238 is not aligned with the second end 236 of the second locking bar 160, then the plug assembly 106 is restricted from rotating.

As illustrated, the valid key independently operates both the key followers 140 and the sliders 162 so as to unlock the rekeyable lock cylinder 100. In the example, both the first and second locking bars 150, 160 are biased in the same direction (e.g., towards the left side of the FIGS. 14 and 15). However, because the first and second locking bars 150, 160 are on disposed on opposite sides of the keyway opening 130, the first and second locking bars 150, 160 are biased in opposite radial directions relative to the longitudinal axis. As such, the first and second locking bars 150, 160 move towards the illustrated unlocked configuration via different structural operations. For example, the first locking bar 150 is biased towards the unlocked configuration and the racks 148 are positioned such that the first locking bar 150 automatically moves out of engagement with the first locking bar engaging slot 110, while the second locking bar 160 is biased towards a locked configuration and the sliders 162 are positioned such that second locking bar 160 is actively cammed out of engagement with the second locking bar engaging slot 112.

In the example, the first locking bar engaging slot 110 has a substantially "C" shaped cross-sectional profile so as to selectively engage with the first locking bar 150 as described herein. Additionally, because the first locking bar 150 is not cammed out of engagement with the first locking bar engaging slot 110, the transfer of rotational torque towards the racks 148 during rotation of the plug assembly 106 is reduced. In contrast, the second locking bar engaging slot 112 has a substantially "V" or "U" shaped cross-sectional profile so as to enable the second locking bar 160 to cam out of the slot as described herein. Thus, the first locking bar engaging slot 110 has a different shape and size than the second locking bar engaging slot 112. Additionally, the racks 148 are different than the sliders 162, and the first locking bar 150 is different than the second locking bar 160. In aspect, the racks 148 may be formed from a different material than the sliders 162. For example, the sliders 162 may be formed from steel while the ranks and other components of the plug assembly 106 may be formed from zinc.

When the rekeyable lock cylinder 100 is in the unlocked configuration, the plug assembly 106 is rotatable within the cylinder body 102 so as to operate the rekeyable lock cylinder 100. Additionally, a valid key can be used to unlock the rekeyable lock cylinder 100 to facilitate rekeying operations of the carrier subassembly 138 while the plug assembly 106 is disposed within the cylinder body 102. In the example, the rekeyable lock cylinder 100 is only rekeyable with respect to the carrier subassembly 138 and the first key cut 168 of the key 134 while the plug assembly 106 is disposed within the cylinder body 102. In contrast, the sliders 162 cannot be rekeyed with respect to the second key cut 172 of the key 134 while the plug assembly 106 is disposed within the cylinder body 102. Rather, to rekey the sliders 162, the plug assembly 106 is removed from the cylinder body 102 such that the sliders 162 are repositioned and/or replaced for a different key cut combination and because the post 252 and the locking bar engaging groove 238 for each slider 162 are at predefined distances 261 (shown in FIG. 10).

In order to rekey the carrier subassembly 138, a valid user key is inserted into the keyway opening 130 and the plug assembly 106 is rotated to a first or learn position (not shown). In the example, the first position is about 90° from a home position of the plug assembly 106 (shown in FIGS. 14 and 15). The first position aligns the first locking bar 150 with one of the third or fourth locking bar engaging slots 114, 116 defined in the cylinder body 102 and the second locking bar 160 with the other of the third or fourth locking bar engaging slots 114, 116. In the example, the third and fourth locking bar engaging slots 114, 116 may have a similar cross-sectional profile and may match the profile of the first locking bar engaging slot 110. In other examples, the third and fourth locking bar engaging slots 114, 116 may be different from one another and only one may match the profile of the first locking bar engaging slot 110. Because the valid key is used, the recess 214 of the racks 148 are aligned with the position of the protruding features 216 and the first locking bar 150 is in the unlocked position. A tool not shown is inserted into the rekeying tool opening 136 (shown in FIG. 1) so as to push on the carrier 146 and move the entire carrier subassembly 138 towards the second end 122 of the plug body 118 (shown in FIG. 2) along the longitudinal axis 104.

As the carrier subassembly 138 moves along the longitudinal axis 104, the spring catch 154 (shown in FIG. 2) moves into one or more detent recess (not shown) within the inner surface of the cylinder body 102 so that the carrier subassembly 138 is captured in the rotated and translated position within the cylinder body 102 (e.g., a rekeying configuration). Moving the carrier 146 along the longitudinal axis 104, slides the rack engagement feature 192 of the key followers 140 (shown in FIG. 5) out of engagement from the pin engagement features 206 of the racks 148 (shown in FIG. 6). The valid key is then removed and a second key is inserted into the keyway opening 130 and used to rotate the plug assembly 106 back towards the home position and release the spring catch 154. As the spring catch 154 leaves the detent recess of the cylinder body 102, the carrier 146 is biased towards the first end 120 of the plug body 118 by the return spring 152 (both shown in FIG. 2), causing the rack engagement features 192 of the key followers 140 to slidingly insert into the pin engagement features 206 of the racks 148 in a different key cut position. At this point, the rekeyable lock cylinder 100 is keyed to the second (now valid) key and the first key no longer facilitates operation of the rekeyable lock cylinder 100. This rekeying operation is described in further detail in U.S. Pat. No. 8,656,747 B2, dated Feb. 25, 2014, and which is incorporated by reference in its entirety.

While the carrier subassembly 138 is being rekeyed, the first locking bar 150 is maintained in the unlocked position via the capture of the position of the racks 148 on the protruding features 216 and the inward biasing of the first locking bar 150. The corresponding third or fourth locking bar engaging slot 114, 116 enables the first locking bar 150 to move as required or desired during the rekeying process. The sliders 162, however, during the rekeying process need to be able to freely side within the plug body 118. As such, the corresponding third or fourth locking bar engaging slot 114, 116 of the second locking bar 160 allows the outward biasing to move the second locking bar 160 out of engagement of the sliders 162 and so that the sliders 162 can freely slide. Additionally, the rekeying keys will have the same second key cut 172 and so that the second locking bar 160 can be cammed during rotation of the plug assembly 106. By including the second key cut 172 on the key and the sliders 162, the number of key cut combinations that the rekeyable lock cylinder 100 can take on is increased and so as to enhance security of the lock.

In other examples, the rekeyable lock cylinder 100 may be configured with tool-less rekeying capabilities like the configurations described in U.S. Pat. No. 8,099,988, dated Jan. 24, 2012, and U.S. Pat. No. 11,319,726, dated May 3, 2022, and which are incorporated by reference in their entireties.

Figure 17:
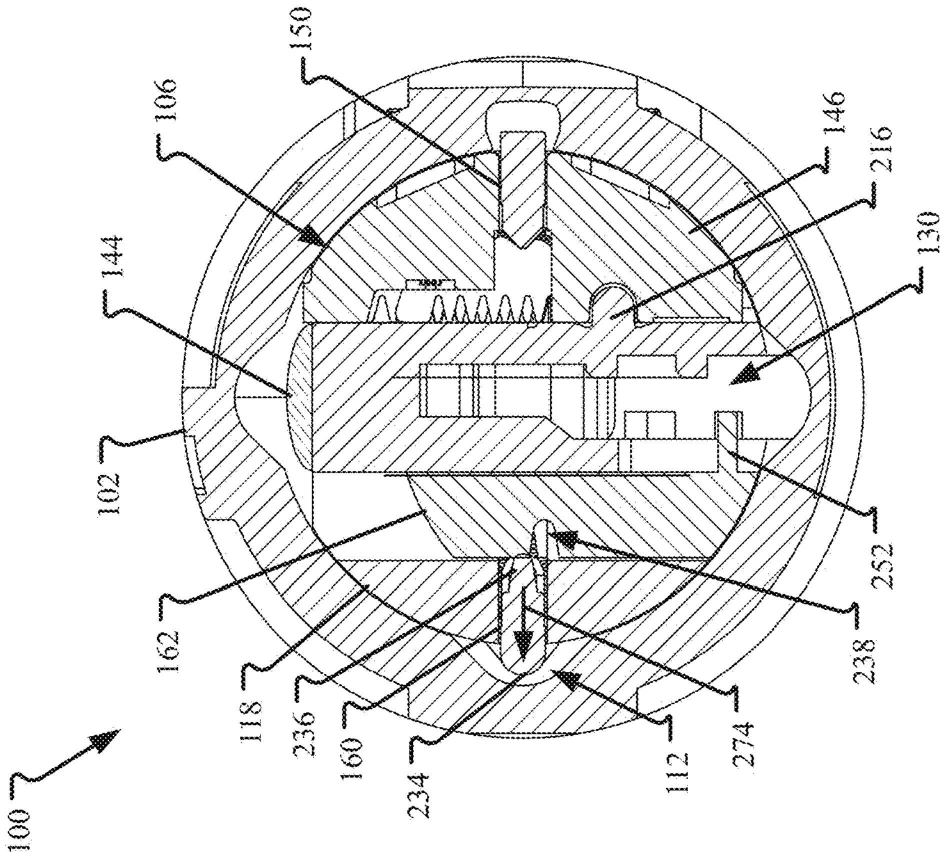
FIGS. 16 and 17 are cross-sectional views of the rekeyable lock cylinder shown in FIGS. 1 and 2 and in a locked configuration.
Figure 16:
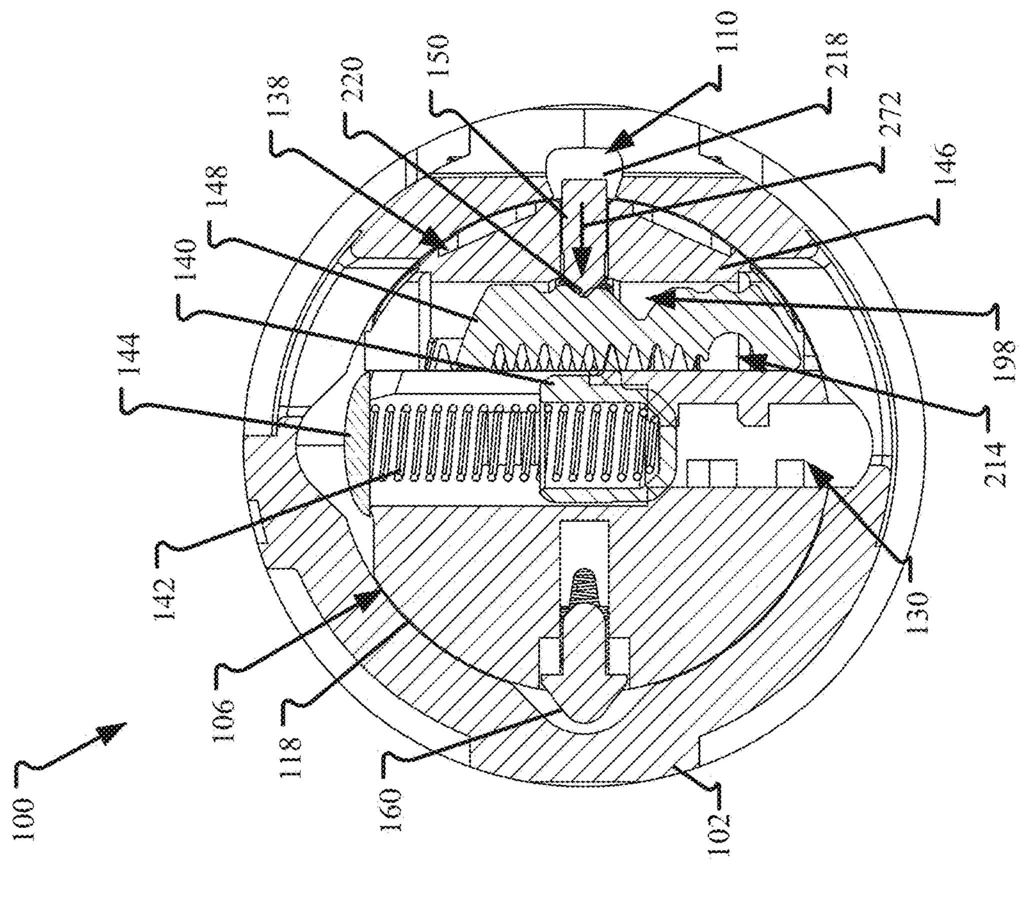

FIGS. 16 and 17 are cross-sectional views of the rekeyable lock cylinder 100 in a locked configuration. Referring concurrently to FIGS. 16 and 17, FIG. 16 is a cross-section taken through the rack 148, while FIG. 17 is a cross-section taken through the slider 162 because the rack 148 and the slider 162 are axially offset. Additionally, certain components are described above and are not necessarily described further below. In the locked configuration, either a non-valid key is inserted into the keyway opening 130 or no key is present (as illustrated) such that both the key follower 140 and the sliders 162 are operationally positioned within the plug assembly 106 and the first and second locking bars 150, 160 are moved/movable towards a locked position. In the locked position, the first and second locking bars 150, 160 are disposed within a shear plane between the cylinder body 102 and the plug assembly 106 and rotation of the plug assembly 106 is prevented.

Starting first with the carrier subassembly 138 and FIG. 16, when no key is present, the biasing member 142 positions the key followers 140 towards bottom of the plug body 118. The key follower 140 moves the rack 148 so that the locking bar engaging groove 198 is not aligned with the first locking bar 150. Because the first locking bar 150 is biased inward 272, the second end 220 cams outward against the locking bar engaging groove 198 so as to move the first end 218 towards and into the first locking bar engaging slot 110 of the cylinder body 102. Once the first locking bar 150 is within the first locking bar engaging slot 110, the plug assembly 106 is blocked from rotating around the longitudinal axis 104 (shown in FIG. 1).

When a non-valid key (e.g., a non-valid first key cut 168 (shown in FIG. 4*a,b*)) is received within the keyway opening 130, the key follower 140 will position the racks 148 in other positions that also do not align the locking bar engaging groove 198 with the first locking bar 150 and so that the first end 218 is disposed at least partially within the first locking bar engaging slot 110. It should be appreciated that the height 202 (shown in FIG. 6) of the locking bar engaging groove 198 may allow for at least a portion of the second end 220 of the first locking bar 150 to be within the locking bar engaging groove 198 in adjacent key cut positions relative to a valid key cut position (e.g., either up or down), while still blocking rotation of the plug assembly 106 and being in the locked position. In the example, only the valid key cut position enables the first locking bar 150 to move into the unlocked position described above.

Additionally, turning to FIG. 17, when no key is present, the sliders 162 move toward the bottom of the plug body 118 via gravity. The sliders 162 are positioned such that the locking bar engaging groove 238 is not aligned with the second locking bar 160. However, unlike the first locking bar 150, the second locking bar 160 is biased outward 274, and as such, the second side 250 (shown in FIGS. 9 and 10) blocks the second locking bar 160 from camming out of the second locking bar engaging slot 112. The first end 234 of the second locking bar 160 is still being urged into the second locking bar engaging slot 112 of the cylinder body 102, and the second end 236 cannot move towards the locking bar engaging groove 238 as it is blocked via the second side 250 of the sliders 162. The plug assembly 106 is restricted from being rotated around the longitudinal axis 104.

Similarly, when a non-valid key (e.g., a non-valid second key cut 172 (shown in FIG. 4*b*)) is received within the keyway opening 130, the sliders 162 are positioned such that the locking bar engaging groove 238 is not aligned with the second locking bar 160. This also blocks the second locking bar 160 from camming out of the second locking bar engaging slot 112. In the example, both the first and second locking bars 150, 160 need to be moved out of the locked position to unlock the rekeyable lock cylinder 100, and this required a key with valid first and second key cuts 168, 172. A key with only one valid key cut, or no valid key cuts, will not be able to unlock the rekeyable lock cylinder 100.

Figure 18:
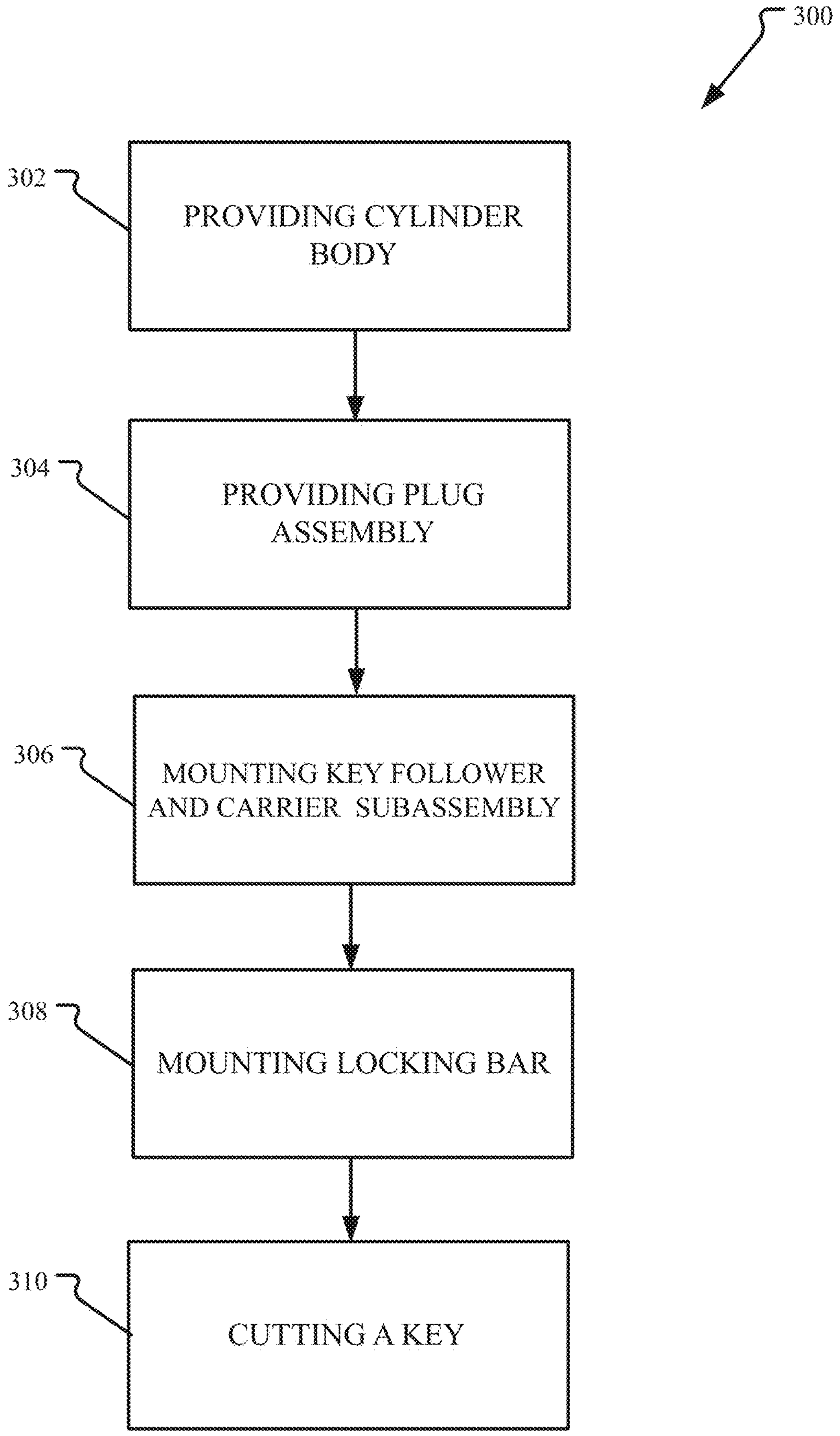
FIG. 18 is a flowchart illustrating an exemplary method of assembling a rekeyable lock cylinder.

FIG. 18 is a flowchart illustrating an exemplary method 300 of assembling a rekeyable lock cylinder. The example methods and operations can be implemented or performed by the assemblies described herein (e.g., the rekeyable lock cylinder 100 shown in FIGS. 1-17). The method 300 begins with providing a cylinder body (operation 302). The cylinder body is at least partially hollow and defines a longitudinal axis. An inner surface of the cylinder body defines at least a first locking bar engaging slot and a second locking bar engaging slot. In an example, the cylinder body is substantially cylindrical in shape. In other examples, the cylinder body may include a chimney extending therefrom. Additionally, a plug assembly having a plug body is provided (operation 304).

At least one key flower and a carrier subassembly are mounted to the plug body (operation 306). The carrier subassembly includes a carrier selectively slidable along the longitudinal axis for rekeying between different keys, a first locking bar slidably mounted on the carrier and selectively engageable with the first locking bar engaging slot to block rotation of the plug assembly relative to the cylinder body, and at least one rack coupled between the at least one key follower and the first locking bar to control movement of the first locking bar. Additionally, a second locking bar is slidably mounted to the plug body (operation 308). The second locking bar is selectively engageable with the second locking bar engaging slot to block rotation of the plug assembly relative to the cylinder body and at least one slider is coupled to the second locking bar to control movement of the second locking bar. In the example, the movement of the at least one slider is independent from the movement of the at least one rack.

In an example, the method 300 may further include cutting a key (operation 310). The key has a first key cut and a second key cut, the first key cut independent and at a different position on a blade than the second key cut. In an aspect, the second key cut is side milled on the blade.

Figure 19:
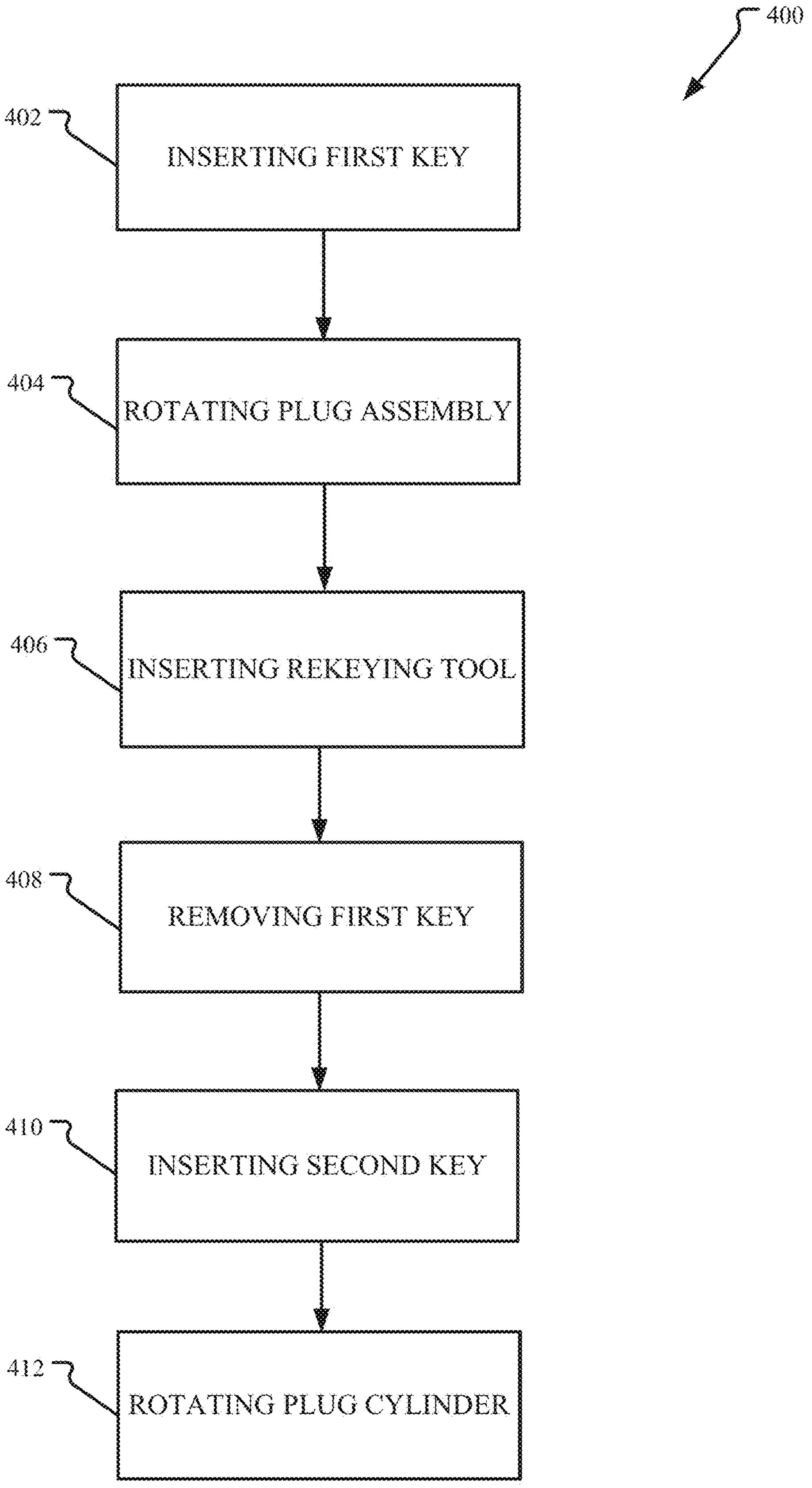
FIG. 19 is a flowchart illustrating an exemplary method of rekeying a rekeyable lock cylinder.

FIG. 19 is a flowchart illustrating an exemplary method 400 of rekeying a rekeyable lock cylinder. The example methods and operations can be implemented or performed by the assemblies described herein (e.g., the rekeyable lock cylinder 100 shown in FIGS. 1-17). The method 400 begins with inserting a first key into a keyway opening (operation 402). The keyway opening is defined in a plug body of a plug assembly of the rekeyable lock cylinder. The first key has a first key cut and a second key cut. The plug assembly includes at least one key follower, a carrier subassembly with a carrier, a first locking bar, and at least one rack coupled between the at least one key follower and the first locking bar, a second locking bar, and at least one slider coupled to the second locking bar. The first key cut positions the first locking bar in an unlocked position and the second key cut positions the second locking bar in an unlocked position. The first key is thereby a valid key.

The plug assembly can then be rotated within a cylinder body (operation 404). Once rotated, a rekeying tool is inserted to longitudinally push the carrier with the at least one rack such that the at least one rack is disengaged with the at least one key follower (operation 406). The first key may then be removed (operation 408). A second key having a third key cut and a fourth key cut is inserted into the keyway opening (operation 410). The plug assembly is then rotated back so as to reengage the at least one rack with the at least one key follower and the first locking bar is rekeyed to the third key cut that is different than the first key cut (operation 412). The fourth key cut being the same as the second key cut. The second key is now the valid key with the first key being inoperable for the rekeyed lock cylinder.

The rekeyable lock cylinder described herein enhances security of a rekeyable lock that is at least partially rekeyable without the plug assembly needing to be removed from the cylinder body. Security is increased with sliders being added and that provide additional key cut combinations. The sliders also increase security as they are operated by a side milling cut on the key which is difficult to duplicate.

EXAMPLES

Illustrative examples of the rekeyable lock cylinder disclosed herein are provided below. An embodiment of the rekeyable lock cylinder may include any one or more, and any combination of, the examples described below.

Example 1. A rekeyable lock cylinder including: a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including: a plug body; at least one key follower slidably mounted on the plug body; a carrier subassembly slidably mounted on the plug body, the carrier subassembly including: a carrier selectively slidable along the longitudinal axis for rekeying between different keys; a first locking bar slidably mounted on the carrier and selectively engageable with the first locking bar engaging slot to block rotation of the plug assembly relative to the cylinder body; and at least one rack coupled between the at least one key follower and the first locking bar to control movement of the first locking bar; a second locking bar slidably mounted on the plug body and selectively engageable with the second locking bar engaging slot to block rotation of the plug assembly relative to the cylinder body; and at least one slider coupled to the second locking bar to control movement of the second locking bar, wherein movement of the at least one slider is independent from the movement of the at least one rack.

Example 2. The rekeyable lock cylinder of any one of examples 1-34, wherein the at least one slider includes a single post extending from a first side and a locking bar engaging groove defined within a second side, opposite the first side.

Example 3. The rekeyable lock cylinder of any one of examples 1-34, wherein the plug body defines a keyway opening extending along the longitudinal axis, the post extending at least partially within the keyway opening such that the at least one slider is actuated directly by a key received within the keyway opening.

Example 4. The rekeyable lock cylinder of any one of examples 1-34, wherein the post is cylindrical.

Example 5. The rekeyable lock cylinder of any one of examples 1-324, wherein the second side of the at least one slider includes anti-picking grooves.

Example 6. The rekeyable lock cylinder of any one of examples 1-34, wherein the at least one slider is disposed on an opposite side of the at least one key follower from the at least one rack.

Example 7. The rekeyable lock cylinder of any one of examples 1-34, wherein the at least one slider is axially offset along the longitudinal axis from the at least one rack.

Example 8. The rekeyable lock cylinder of any one of examples 1-34, wherein the at least one slider is formed from a different material than the at least one rack.

Example 9. The rekeyable lock cylinder of any one of examples 1-34, wherein the first locking bar and the second locking bar are biased in a same direction.

Example 10. The rekeyable lock cylinder of any one of examples 1-34, wherein the first locking bar engaging slot is spaced approximately 180° from the second locking bar engaging slot.

Example 11. The rekeyable lock cylinder of any one of examples 1-34, wherein the cylinder body defines at least one third locking bar engaging slot for rekeying the carrier subassembly.

Example 12. The rekeyable lock cylinder of any one of examples 1-34, wherein the at least one slider is not rekeyable within the cylinder body while the plug assembly is disposed within the cylinder body.

Example 13. A rekeyable lock cylinder assembly including: a key having blade with a first key cut and a second key cut, the first key cut independent and at a different position on the blade than the second key cut; a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including: a plug body defining a keyway opening for receiving the key; at least one key follower slidably mounted on the plug body and configured to interact with the first key cut when the key is received within the keyway opening; a carrier subassembly slidably mounted on the plug body, the carrier subassembly including: a carrier selectively slidable along the longitudinal axis for rekeying between different keys; a first locking bar slidably mounted on the carrier and selectively engageable with the first locking bar engaging slot to block rotation of the plug assembly relative to the cylinder body; and at least one rack coupled between the at least one key follower and the first locking bar to control movement of the first locking bar; a second locking bar slidably mounted on the plug body and selectively engageable with the second locking bar engaging slot to block rotation of the plug assembly relative to the cylinder body; and at least one slider coupled to the second locking bar to control movement of the second locking bar, wherein the at least one slider is configured to interact with the second key cut when the key is received within the keyway opening.

Example 14. The rekeyable lock cylinder assembly of any one of examples 1-34, wherein the plug assembly is only rekeyable with respect to the carrier subassembly and the first key cut of the key while the plug assembly is disposed within the cylinder body.

Example 15. The rekeyable lock cylinder assembly of any one of examples 1-34, wherein the first key cut is transversely office in two orthogonal directions relative to the second key cut on the blade.

Example 16. The rekeyable lock cylinder assembly of any one of examples 1-34, wherein the plug body includes at least one transverse channel that slidingly receives the at least one slider, the at least one transverse channel being at least partially open with respect to the keyway opening.

Example 17. The rekeyable lock cylinder assembly of any one of examples 1-34, wherein the at least one slider includes a post extending at least partially within the keyway opening and configured to engage with the second key cut of the key.

Example 18. The rekeyable lock cylinder assembly of any one of examples 1-34, wherein the first locking bar engaging slot has a different shape and size than the second locking bar engaging slot.

Example 19. The rekeyable lock cylinder assembly of any one of examples 1-34, wherein the at least one slider includes a first slider and a second slider, the first slider different than the second slider.

Example 20. The rekeyable lock cylinder assembly of any one of examples 1-34, wherein the at least one rack includes a first rack and a second rack, the first rack the same as the second rack.

Example 21. The rekeyable lock cylinder assembly of any one of examples 1-34, wherein the at least one slider is not spring biased.

Example 22. The rekeyable lock cylinder assembly of any one of examples 1-34, wherein the keyway opening is not a KW1 keyway opening.

Example 23. A method of assembling a rekeyable lock cylinder including: providing a cylinder body defining a longitudinal axis, wherein the cylinder body defines a first locking bar engaging slot and a second locking bar engaging slot; providing a plug assembly having a plug body; mounting at least one key follower and a carrier subassembly to the plug body, the carrier subassembly including a carrier selectively slidable along the longitudinal axis for rekeying between different keys, a first locking bar slidably mounted on the carrier and selectively engageable with the first locking bar engaging slot to block rotation of the plug assembly relative to the cylinder body, and at least one rack coupled between the at least one key follower and the first locking bar to control movement of the first locking bar; and slidably mounting a second locking bar to the plug body that selectively engageable with the second locking bar engaging slot to block rotation of the plug assembly relative to the cylinder body and at least one slider coupled to the second locking bar to control movement of the second locking bar, wherein movement of the at least one slider is independent from the movement of the at least one rack.

Example 24. The method of any one of examples 1-34, further including cutting a key with a first key cut and a second key cut, the first key cut independent and at a different position on a blade than the second key cut.

Example 25. A method of rekeying a rekeyable lock cylinder including: inserting a first key into a keyway opening of a plug body of a plug assembly of the rekeyable lock cylinder, the first key having a first key cut and a second key cut, the plug assembly including at least one key follower, a carrier subassembly with a carrier, a first locking bar, and at least one rack coupled between the at least one key follower and the first locking bar, a second locking bar, and at least one slider coupled to the second locking bar, wherein the first key cut positions the first locking bar in an unlocked position and the second key cut positions the second locking bar in an unlocked position; rotating the plug assembly within a cylinder body; inserting a rekeying tool to longitudinally push the carrier with the at least one rack such that the at least one rack is disengaged with the at least one key follower; removing the first key; inserting a second key having a third key cut and a fourth key cut; and rotating the plug assembly so as to reengage the at least one rack with the at least one key follower and the first locking bar is rekeyed to the third key cut that is different than the first key cut, the fourth key cut being the same as the second key cut.

Example 26. The method of any one of examples 1-34, wherein the second key cut is not rekeyable while the plug assembly is disposed within the cylinder body.

Example 27. A rekeyable lock cylinder including: a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including: a plug body defining a keyway opening configured to receive a key, the keyway opening having a top portion and first and second side portions facing each other; at least one key follower slidably mounted on the plug body and disposed at least partially within the top portion of the keyway opening; a carrier subassembly slidably mounted on the plug body, the carrier subassembly including: a carrier selectively slidable along the longitudinal axis for rekeying between different keys; a first locking bar slidably mounted on the carrier and selectively engageable with the first locking bar engaging slot to block rotation of the plug assembly relative to the cylinder body; and at least one rack coupled between the at least one key follower and the first locking bar to control movement of the first locking bar; a second locking bar slidably mounted on the plug body and selectively engageable with the second locking bar engaging slot to block rotation of the plug assembly relative to the cylinder body; and at least one slider coupled to the second locking bar to control movement of the second locking bar, the at least one slider having a post that extends at least partially into the keyway opening from the second side portion.

Example 28. The rekeyable lock cylinder of any one of examples 1-34, wherein the second side portion of the keyway opening is substantially planar.

Example 29. The rekeyable lock cylinder of any one of examples 1-34, wherein the first side portion of the keyway opening includes at least one traverse plug.

Example 30. The rekeyable lock cylinder of any one of examples 1-34, wherein the at least one transverse plug faces the at least one slider within the keyway opening.

Example 31. The rekeyable lock cylinder of any one of examples 1-34, wherein the second side portion of the keyway opening does not include a transverse plug.

Example 32. The rekeyable lock cylinder of any one of examples 1-34, further including a key, the key including a first key cut configured to operationally engage with the at least one key follower and a second key cut configured to operationally engage with the post of the at least one slider.

Example 33. The rekeyable lock cylinder of any one of examples 1-34, wherein the second key cut is a side milled channel defined on a blade of the key.

Example 34. The rekeyable lock cylinder of any one of examples 1-34, wherein the side milled channel has a tapered entry disposed at a distal end of the blade.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A rekeyable lock cylinder comprising:

a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including:

a plug body;

at least one key follower slidably mounted on the plug body;

a carrier subassembly slidably mounted on the plug body, the carrier subassembly including:

a carrier selectively slidable along the longitudinal axis for rekeying between different keys;

a first locking bar slidably mounted on the carrier and selectively engageable with the first locking bar engaging slot to block rotation of the plug assembly relative to the cylinder body; and at least one rack coupled between the at least one key follower and the first locking bar to control movement of the first locking bar;

a second locking bar slidably mounted on the plug body and selectively engageable with the second locking bar engaging slot to block rotation of the plug assembly relative to the cylinder body; and at least one slider coupled to the second locking bar to control movement of the second locking bar, wherein movement of the at least one slider is independent from the movement of the at least one rack, wherein the at least one slider is not rekeyable within the cylinder body while the plug assembly is disposed within the cylinder body.

2. The rekeyable lock cylinder of claim 1, wherein the at least one slider includes a single post extending from a first side and a locking bar engaging groove defined within a second side, opposite the first side.

3. The rekeyable lock cylinder of claim 2, wherein the plug body defines a keyway opening extending along the longitudinal axis, the post extending at least partially within the keyway opening such that the at least one slider is actuated directly by a key received within the keyway opening.

4. The rekeyable lock cylinder of claim 2, wherein the post is cylindrical.

5. The rekeyable lock cylinder of claim 2, wherein the second side of the at least one slider includes anti-picking grooves.

6. The rekeyable lock cylinder of claim 1, wherein the at least one slider is disposed on an opposite side of the at least one key follower from the at least one rack.

7. The rekeyable lock cylinder of claim 6, wherein the at least one slider is axially offset along the longitudinal axis from the at least one rack.

8. The rekeyable lock cylinder of claim 1, wherein the at least one slider is formed from a different material than the at least one rack.

9. The rekeyable lock cylinder of claim 1, wherein the first locking bar and the second locking bar are biased in a same direction.

10. The rekeyable lock cylinder of claim 1, wherein the first locking bar engaging slot is spaced approximately 180° from the second locking bar engaging slot.

11. The rekeyable lock cylinder of claim 10, wherein the cylinder body defines at least one third locking bar engaging slot for rekeying the carrier subassembly.

12. A rekeyable lock cylinder assembly comprising:

a key having blade with a first key cut and a second key cut, the first key cut independent and at a different position on the blade than the second key cut, wherein the first key cut is transversely offset in two orthogonal directions relative to the second key cut on the blade;

a cylinder body defining a longitudinal axis, wherein the cylinder body defines a first locking bar engaging slot and a second locking bar engaging slot; and a plug assembly disposed at least partially within the cylinder body and being selectively rotatable around the longitudinal axis, the plug assembly including:

a plug body defining a keyway opening for receiving the key;

at least one key follower slidably mounted on the plug body and configured to interact with the first key cut when the key is received within the keyway opening;

a carrier subassembly slidably mounted on the plug body, the carrier subassembly including:

a carrier selectively slidable along the longitudinal axis for rekeying between different keys;

a first locking bar slidably mounted on the carrier and selectively engageable with the first locking bar engaging slot to block rotation of the plug assembly relative to the cylinder body; and at least one rack coupled between the at least one key follower and the first locking bar to control movement of the first locking bar;

a second locking bar slidably mounted on the plug body and selectively engageable with the second locking bar engaging slot to block rotation of the plug assembly relative to the cylinder body; and at least one slider coupled to the second locking bar to control movement of the second locking bar, wherein the at least one slider is configured to interact with the second key cut when the key is received within the keyway opening.

13. The rekeyable lock cylinder assembly of claim 12, wherein the plug assembly is only rekeyable with respect to the carrier subassembly and the first key cut of the key while the plug assembly is disposed within the cylinder body.

14. The rekeyable lock cylinder assembly of claim 12, wherein the plug body includes at least one transverse channel that slidingly receives the at least one slider, the at least one transverse channel being at least partially open with respect to the keyway opening.

15. The rekeyable lock cylinder assembly of claim 14, wherein the at least one slider includes a post extending at least partially within the keyway opening and configured to engage with the second key cut of the key.

16. The rekeyable lock cylinder assembly of claim 12, wherein the first locking bar engaging slot has a different shape and size than the second locking bar engaging slot.

17. The rekeyable lock cylinder assembly of claim 12, wherein the at least one slider includes a first slider and a second slider, the first slider different than the second slider.

18. A method of rekeying a rekeyable lock cylinder comprising:

inserting a first key into a keyway opening of a plug body of a plug assembly of the rekeyable lock cylinder, the first key having a first key cut and a second key cut, the plug assembly including at least one key follower, a carrier subassembly with a carrier, a first locking bar, and at least one rack coupled between the at least one key follower and the first locking bar, a second locking bar, and at least one slider coupled to the second locking bar, wherein the first key cut positions the first locking bar in an unlocked position and the second key cut positions the second locking bar in an unlocked position;

rotating the plug assembly within a cylinder body;

inserting a rekeying tool to longitudinally push the carrier with the at least one rack such that the at least one rack is disengaged with the at least one key follower;

removing the first key;

inserting a second key having a third key cut and a fourth key cut; and rotating the plug assembly so as to reengage the at least one rack with the at least one key follower and the first locking bar is rekeyed to the third key cut that is different than the first key cut, the fourth key cut being the same as the second key cut, wherein the at least one slider is not rekeyable within the cylinder body while the plug assembly is disposed within the cylinder body.

* * * * *